US010562805B2

(12) United States Patent
Hanawa et al.

(10) Patent No.: US 10,562,805 B2
(45) Date of Patent: Feb. 18, 2020

(54) SINTERED FORMED BODY AND MANUFACTURING METHOD THEREOF, ARTICLE HAVING SINTERED FORMED BODY, SINTERED FORMED BODY MATERIAL, AND PRE-SINTERING FORMED BODY AND MANUFACTURING METHOD THEREOF

(71) Applicant: AGC Inc., Chiyoda-ku (JP)

(72) Inventors: Yu Hanawa, Chiyoda-ku (JP); Masamichi Tanida, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 21 days.

(21) Appl. No.: 15/852,124

(22) Filed: Dec. 22, 2017

(65) Prior Publication Data
US 2018/0118610 A1 May 3, 2018

Related U.S. Application Data

(63) Continuation of application No. PCT/JP2016/068659, filed on Jun. 23, 2016.

(30) Foreign Application Priority Data

Jun. 23, 2015 (JP) .................. 2015-126066

(51) Int. Cl.
*B23B 7/02* (2006.01)
*C03C 3/089* (2006.01)
(Continued)

(52) U.S. Cl.
CPC .............. *C03C 3/089* (2013.01); *B28B 1/001* (2013.01); *B29C 64/112* (2017.08); *B33Y 10/00* (2014.12);
(Continued)

(58) Field of Classification Search
CPC ... B28B 1/001; B29C 64/112; B29K 2105/16; B29K 2509/08; B29L 2031/3475;
(Continued)

(56) References Cited

U.S. PATENT DOCUMENTS 5,008,584 A * 4/1991 Atsumi ................. H01T 13/41
252/503
6,090,227 A * 7/2000 Leichtfried ........... C03B 37/095
148/423
(Continued)

FOREIGN PATENT DOCUMENTS

CN 105705466 A 6/2016
JP 62-173798 7/1987
(Continued)

OTHER PUBLICATIONS

International Search Report dated Sep. 20, 2016 in PCT/JP2016/068659, filed on Jun. 23, 2016 (with English Translation).
(Continued)

*Primary Examiner* — Lawrence D Ferguson
(74) *Attorney, Agent, or Firm* — Oblon, McClelland, Maier & Neustdt, L.L.P.

(57) ABSTRACT

A sintered formed body containing a glass in which undesired coloring in a blackish color, incomplete sintering, a lack of strength, and formation of bubbles are suppressed, and an article provided with the same are provided. Provided are a sintered formed body and an article provided with the same, the sintered formed body consisting of a sintered body containing a glass, and having a thick part with a thickness of 60 μm or more, in which a carbon content from a position of a surface of the thick part to a position at a depth of at least 30 μm from the surface of the thick part is 0.7 to 15 mass ppm.

31 Claims, 1 Drawing Sheet

(51) Int. Cl.

| | | |
|---|---|---|
| *C03B 19/06* | (2006.01) | |
| *B33Y 80/00* | (2015.01) | |
| *B33Y 70/00* | (2015.01) | |
| *C04B 35/64* | (2006.01) | |
| *C04B 35/622* | (2006.01) | |
| *C04B 35/14* | (2006.01) | |
| *C03C 8/16* | (2006.01) | |
| *B33Y 10/00* | (2015.01) | |
| *B29C 64/112* | (2017.01) | |
| *B28B 1/00* | (2006.01) | |
| *C03B 19/01* | (2006.01) | |
| *C03C 3/06* | (2006.01) | |
| *C03C 3/064* | (2006.01) | |
| *C03C 3/066* | (2006.01) | |
| *C03C 3/091* | (2006.01) | |
| *C03C 3/093* | (2006.01) | |
| *B29K 105/16* | (2006.01) | |
| *B29K 509/08* | (2006.01) | |
| *B29L 31/34* | (2006.01) | |

(52) U.S. Cl.
CPC ............... *B33Y 70/00* (2014.12); *B33Y 80/00* (2014.12); *C03B 19/01* (2013.01); *C03B 19/06* (2013.01); *C03C 3/06* (2013.01); *C03C 3/064* (2013.01); *C03C 3/066* (2013.01); *C03C 3/091* (2013.01); *C03C 3/093* (2013.01); *C03C 8/16* (2013.01); *C04B 35/14* (2013.01); *C04B 35/622* (2013.01); *C04B 35/64* (2013.01); *B29K 2105/16* (2013.01); *B29K 2509/08* (2013.01); *B29L 2031/3475* (2013.01)

(58) Field of Classification Search
CPC ......... B33Y 10/00; B33Y 70/00; B33Y 80/00; C03B 19/01; C03B 19/06; C03C 3/06; C03C 3/064; C03C 3/066; C03C 3/089; C03C 3/091; C03C 3/093; C03C 8/16; C04B 35/14; C04B 35/622; C04B 35/64
See application file for complete search history.

(56) References Cited

U.S. PATENT DOCUMENTS

| | | |
|---|---|---|
| 6,531,191 B1 | 3/2003 | Notenboom |
| 2004/0161544 A1 | 8/2004 | Kasperchik |
| 2008/0096026 A1* | 4/2008 | Yamada ............ B32B 17/10036 428/426 |

FOREIGN PATENT DOCUMENTS

| | | |
|---|---|---|
| JP | 11-508326 | 7/1999 |
| JP | 2000-317316 | 11/2000 |
| JP | 2006-515812 | 6/2006 |
| JP | 2009-173517 | 8/2009 |
| KR | 10-2016-0078958 | 7/2016 |
| TW | 201522259 A | 6/2015 |
| WO | WO 97/38810 | 10/1997 |
| WO | WO 2015/068686 A1 | 5/2015 |

OTHER PUBLICATIONS

Written Opinion dated Sep. 20, 2016 in PCT/JP2016/068659, filed on Jun. 23, 2016.

* cited by examiner

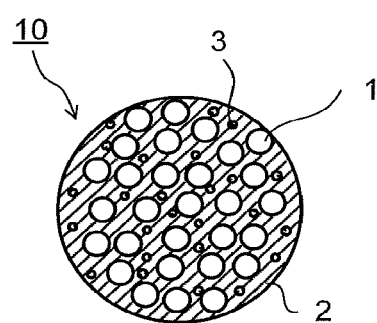

SINTERED FORMED BODY AND MANUFACTURING METHOD THEREOF, ARTICLE HAVING SINTERED FORMED BODY, SINTERED FORMED BODY MATERIAL, AND PRE-SINTERING FORMED BODY AND MANUFACTURING METHOD THEREOF

CROSS-REFERENCE TO RELATED APPLICATIONS

This application is a continuation of prior International Application No. PCT/JP2016/068659, filed on Jun. 23, 2016 which is based upon and claims the benefit of priority from Japanese Patent Application No. 2015-126066, filed on Jun. 23, 2015; the entire contents of all of which are incorporated herein by reference.

FIELD

The present invention relates to a sintered formed body and a manufacturing method thereof, an article having a sintered formed body, a sintered formed body material, and a pre-sintering formed body and a manufacturing method thereof.

BACKGROUND

Conventionally, a sintered formed body made of a glass has been obtained in a manner that an inorganic material including glass particles is formed in a predetermined shape by using an organic binder, and after that, the organic binder is removed and the glass is sintered and solidified through sintering.

For example, it has been known to obtain a housing for an electric equipment in a manner that various green sheets are produced by using a paste prepared by adding an organic binder to an inorganic material including glass particles and ceramic particles, the obtained green sheets are used as they are or a plurality of pieces thereof are combined to be sintered, the resultants are then formed to have a desired shape, and then sintered to obtain a sintered formed body.

Further, it has been known that in a sealing glass used for sealing glass substrates or the like, a paste prepared by adding an organic binder, a solvent, or the like to an inorganic material including glass particles is, for example, sandwiched between desired regions of a pair of glass substrates facing each other and then sintered to make the sealing glass which seals the glass substrates. In an article such as a glass package obtained in a manner as described above, the sealing glass is used as a member which configures a part of the article.

Furthermore, recently, a sintered formed body has been manufactured by combining glass particles and an organic binder in a three-dimensional printing technique. Concretely, there has been known a method, as one of methods in the three-dimensional printing, in which a compressed powder layer is prepared for forming each individual layer of a desired product, and an operation in which an organic binder is adhered to the powder layer in a two-dimensional pattern, and then a new powder layer is prepared on the layer, and an organic binder is adhered in a two-dimensional pattern, is repeated, to thereby obtain a three-dimensionally-formed three-dimensional formed article, and it has been proposed to use a glass particle as the powder in the method (refer to Patent Reference 1(JP-A No. 2006-515812), for example).

SUMMARY OF THE INVENTION

Here, in each of the above-described cases, when producing the sintered formed body using the material in which the glass particles and the organic binder are combined, there are concerns, with respect to the obtained sintered formed body, regarding a problem that the sintered formed body is colored in a blackish color derived from the organic binder, a lack of strength and formation of bubbles due to incomplete sintering.

The present invention is made for solving the above-described problems, and an object thereof is to provide a sintered formed body containing a glass in which undesired coloring in a blackish color, incomplete sintering, a lack of strength, and formation of bubbles are suppressed, and an article having the same. Further, the present invention has an object to provide, in manufacture of a sintered formed body containing a glass, a manufacturing method of the sintered formed body in which undesired coloring in a blackish color, incomplete sintering, a lack of strength, and formation of bubbles are suppressed. Further, the present invention has an object to provide a sintered formed body material and a pre-sintering formed body and a manufacturing method thereof which suppresses, in manufacture of a sintered formed body containing a glass, undesired coloring in a blackish color, incomplete sintering, a lack of strength, and formation of bubbles in the obtained sintered formed body.

The present invention provides a sintered formed body with the following configuration and a manufacturing method thereof, an article having the sintered formed body, a sintered formed body material, and a pre-sintering formed body and a manufacturing method thereof.

[1] A sintered formed body, consisting of a sintered body containing a glass, and having a thick part with a thickness of 60 μm or more, wherein a carbon content from a position of a surface of the thick part to a position at a depth of at least 30 μm from the surface of the thick part is 0.7 to 15 mass ppm.

[2] In the sintered formed body described in [1], the glass has a softening point temperature of 700° C. or more, and contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43.

[3] In the sintered formed body described in [1], a content of a polyvalent element from the position of the surface of the thick part to the position at the depth of at least 30 μm from the surface of the thick part is 1 mass ppm or more.

[4] A sintered formed body, consisting of a sintered body containing a glass whose transition point temperature is 550° C. or less, wherein the sintered formed body has a portion where a carbon content from a position of a surface of the sintered formed body to a position at a depth of at least 30 μm from the surface of the sintered formed body is 0.7 to 15 mass ppm.

[5] In the sintered formed body described in [4], the glass has a softening point temperature of 700° C. or more, and contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43.

[6] In the sintered formed body described in [4], the sintered formed body has a portion where a content of a polyvalent element from the position of the surface of the sintered formed body to the position at the depth of at least 30 μm from the surface of the sintered formed body is 1 mass ppm or more.

[7] The sintered formed body described in [1] obtained by forming in a predetermined shape by using glass particles and an organic binder and then sintering. Specifically, the sintered formed body described in [1] obtained by sintering a pre-sintering formed body which is formed in a predetermined shape by using glass particles and an organic binder.

[8] In the sintered formed body described in [7], the organic binder contains any of a polymerizable resin, a depolymerizable resin, and a resin containing oxygen in its structure.

[9] In the sintered formed body described in [8], the organic binder contains any of a polymethacrylate-based resin or a copolymer thereof, a polypropylene carbonate-based resin, a polymeric cellulose derivative-based resin, a polyvinyl butyral-based resin, and a polyethylene glycol-based resin.

[10] In the sintered formed body described in [7], the forming is performed by a three-dimensional shaping device.

[11] An article including the sintered formed body described in [1].

[12] A sintered formed body material, including glass particles and an organic binder, in which the organic binder contains any of a polymerizable resin, a depolymerizable resin, and a resin containing oxygen in its structure.

[13] In the sintered formed body material described in [12] being the sintered formed body material including the glass particles and the organic binder, the organic binder contains any of a polymethacrylate-based resin or a copolymer thereof, a polypropylene carbonate-based resin, a polymeric cellulose derivative-based resin, a polyvinyl butyral-based resin, and a polyethylene glycol-based resin.

[14] In the sintered formed body material described in [12] being the sintered formed body material including the glass particles and the organic binder, the glass particle has a softening point temperature of 700° C. or more, and contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43.

[15] The sintered formed body material described in [12], further including a polyvalent element provided around the glass particles.

[16] In the sintered formed body material described in [15], the sintered formed body material has the polyvalent element at any of a surface of the glass particle, a surface of a particulate aggregate of glass particles obtained by mixing the glass particles and an organic binder for glass particle, an inside of the particulate aggregate of glass particles obtained by mixing the glass particles and the organic binder for glass particle, a surface of a glass particle covered with organic binder in which a covering layer of the organic binder for glass particle is provided on a surface of the glass particle, and an inside of the covering layer of the glass particle covered with organic binder in which the covering layer of the organic binder for glass particle is provided on the surface of the glass particle.

[17] In the sintered formed body material described in [15], the polyvalent element is contained by 1 mass ppm or more relative to a mass of the glass particles.

[18] In the sintered formed body material described in [12], the glass particle has a particle diameter $D_{50}$ of 5 nm to 200 μm.

[19] The sintered formed body material described in [12] used for manufacturing the sintered formed body described in [1].

[20] A manufacturing method of a pre-sintering formed body, including forming a pre-sintering formed body in a predetermined shape by using a sintered formed body material containing glass particles and an organic binder, in which the organic binder includes an organic binder for forming used for forming the pre-sintering formed body and/or an organic binder for glass particle used together with the glass particles, and the sintered formed body material is the sintered formed body material described in [12].

[21] A manufacturing method of a pre-sintering formed body, including forming a pre-sintering formed body in a predetermined shape by using a sintered formed body material containing glass particles and an organic binder, wherein: the organic binder includes an organic binder for forming used for forming the pre-sintering formed body and/or an organic binder for glass particle used together with the glass particles; and the manufacturing method of the pre-sintering formed body further comprises adding a composition containing a polyvalent element to the organic binder for forming or a precursor of the pre-sintering formed body so that a content of the polyvalent element becomes 1 mass ppm or more relative to a mass of the glass particles.

[22] In the manufacturing method of the pre-sintering formed body described in [20], the organic binder contains any of a polymerizable resin, a depolymerizable resin, and a resin containing oxygen in its structure.

[23] In the manufacturing method of the pre-sintering formed body described in [22], the organic binder contains any of a polymethacrylate-based resin or a copolymer thereof, a polypropylene carbonate-based resin, a polymeric cellulose derivative-based resin, a polyvinyl butyral-based resin, and a polyethylene glycol-based resin.

[24] In the manufacturing method of the pre-sintering formed body described in [21], the composition is a salt of the polyvalent element or a solution of the salt.

[25] In the manufacturing method of the pre-sintering formed body described in [20], the forming is performed by a three-dimensional shaping device.

[26] A pre-sintering formed body manufactured by the manufacturing method of the pre-sintering formed body described in [20].

[27] A manufacturing method of a sintered formed body, including manufacturing a pre-sintering formed body by the manufacturing method of the pre-sintering formed body described in [20], and sintering the pre-sintering formed body at a temperature between a transition point temperature of the glass particles to a softening point+50° C. to obtain a sintered formed body.

[28] A sintered formed body, consisting of a sintered body containing a glass, and having a thick part with a thickness of 60 μm or more, in which a carbon content from a position of a surface of the thick part to a position at a depth of at least 30 μm from the surface of the thick part is 1 to 10 mass ppm.

[29] A sintered formed body, consisting of a sintered body containing a glass whose transition point temperature is 550° C. or less, in which there is a portion where a carbon content from a position of a surface of the sintered formed body to a position at a depth of at least 30 μm from the surface of the sintered formed body is 1 to 10 mass ppm.

[30] A sintered formed body material, including glass particles and a polyvalent element provided around the glass particles.

[31] The sintered formed body described in [4], obtained by forming in a predetermined shape by using glass particles and an organic binder and then sintering.

[32] The sintered formed body described in [31], wherein the organic binder contains any of a polymerizable resin, a depolymerizable resin, and a resin containing oxygen in its structure.

[33] The sintered formed body described in [32], wherein the organic binder contains any of a polymethacrylate-based resin or a copolymer thereof, a polypropylene carbonate-based resin, a polymeric cellulose derivative-based resin, a polyvinyl butyral-based resin, and a polyethylene glycol-based resin.

[34] The sintered formed body described in [31], wherein the forming is performed by a three-dimensional shaping device.

[35] An article comprising the sintered formed body described in [4].

[36] The sintered formed body material described in [12], used for manufacturing the sintered formed body described in [4].

According to the present invention, it is possible to provide a sintered formed body containing a glass in which undesired coloring in a blackish color, incomplete sintering, a lack of strength, and formation of bubbles are suppressed, and an article having the same.

BRIEF DESCRIPTION OF THE DRAWINGS

FIG. 1 is a sectional view illustrating one example of an embodiment of a sintered formed body material of the present invention.

MODE FOR CARRYING OUT THE INVENTION

Hereinafter, modes for carrying out the present invention will be described.
[First Sintered Formed Body]

A first sintered formed body is a sintered formed body made of a sintered body containing a glass and having a thick part with a thickness of 60 μm or more, in which a carbon content from a position of a surface of the thick part to a position at a depth of at least 30 μm from the surface of the thick part is 0.7 to 15 mass ppm, and preferably 1 to 10 mass ppm. In the present specification, when description is simply made as ppm, this means mass ppm. Further, the mass ppm of the carbon content indicates mass ppm relative to a mass of the sintered formed body.

The first sintered formed body is made of a sintered body containing a glass, and a shape thereof is not particularly limited as long as it has a thick part with a thickness of 60 μm or more (hereinafter, also simply referred to as "thick part"). Further, as long as the first sintered formed body is made of a sintered body, methods therefor regarding sintering and forming are also not particularly limited. The first sintered formed body itself may solely configure a product, or it may also be a part of a product such as a sealing glass which configures the product together with another member.

It can be said that the thickness of the first sintered formed body is a distance from an arbitrary point at a surface of the formed body to a point at which a line extended in a substantially normal direction to an inside of the formed body reaches a surface of a rear side. For example, in a case of a plate-shaped body, the thickness corresponds to a distance between facing two principal surfaces, and a part with the thickness of 60 μm or more is referred to as the thick part. Further, in a case of a rectangular solid, for example, all of distances in three directions measured as distances between three pairs of two faces facing each other, are each set as "thickness," and when there is a part with the thickness of 60 μm or more in any of the directions, a part along the thickness direction is referred to as the thick part. Further, in a case of a solid with a complicated surface shape, a thickness thereof indicates a thickness measured by a caliper, a micrometer, a measuring microscope, a three-dimensional shape measuring device, an X-ray CT, or the like, and when there is a part with the thickness of 60 μm or more, a part along the thickness direction is referred to as the thick part.

As the sintered body containing the glass configuring the first sintered formed body, for example, there can be cited a sintered body of an inorganic material containing a glass of 10 to 100 volume % as a composition excluding a locally existing trace component such as carbon described above or a polyvalent element to be described later. The glass is not particularly limited as long as it is one capable of being stably sintered from a material for forming a sintered body such as glass particles. Concretely, it is possible to apply an oxide glass of silica base, boric acid base, phosphoric acid base, germane acid base, or the like, and further, it is also possible to apply not only the oxide glass but also a halide glass and a chalcogenide glass. The glass may also be a glass with a low glass transition point such as one contained by a second sintered formed body. As inorganic materials other than the glass, there can be cited ceramics, metals, semiconductors, gasses, and the like.

For example, the following glass can be exemplified. A glass containing, in mass percentage (%) based on following oxides, $SiO_2$: 0 to 100,
$B_2O_3$: 0 to 60,
$Al_2O_3$: 0 to 30,
$Bi_2O_3$: 0 to 90,
$P_2O_5$: 0 to 70,
$SiO_2+B_2O_3+Al_2O_3+Bi_2O_3+P_2O_5$: 30 to 100,
$SnO+ZnO$: 0 to 70,
$MgO+CaO+SrO+BaO$: 0 to 60, and
$Li_2O+Na_2O+K_2O$: 0 to 30.

It is preferable that the glass of the first sintered formed body has a transition point temperature (also simply referred to as a transition point, in the present invention) of greater than 550° C. Note that in the present invention, the transition point temperature is measured by differential thermal analysis (DTA) (the same applies to the description hereinafter).

In the thick part of the first sintered formed body, the carbon content from the position of the surface to the position at the depth of at least 30 μm from the surface is 0.7 to 15 mass ppm, and preferably 1 to 10 mass ppm. Here, the depth from the surface in the thick part indicates a distance from the surface in the thickness direction (thickness measurement direction) of the thick part. Note that in the present invention, it is only required that the first sintered formed body has a portion, in at least a part thereof, in which the carbon content from the position of the surface to the position at the depth of at least 30 μm from the surface is 0.7 to 15 mass ppm, and preferably 1 to 10 mass ppm in the above-described thick part, and the carbon contents from the positions of all of the surfaces of all of the thick parts to the positions at the depth of at least 30 μm from the surfaces do not always have to fall within the above-described range.

Concretely, when a predetermined place positioned at the surface of the thick part of the first sintered formed body is set to $ST_0$, and a position at a depth of 30 μm from $ST_0$ set as a starting point is set to $ST_{30}$, the first sintered formed body is only required to have the carbon content within the above-described range in the range from $ST_0$ to at least $ST_{30}$. According to need, the range from $ST_0$ to $ST_{30}$ is also referred to as a surface layer portion, and a portion deeper than $ST_{30}$ is also referred to as an inner layer portion. The first sintered formed body is only required to have the carbon content within the above-described range in at least the surface layer portion. According to need, the range where the carbon content falls within the above-described range may extend to the inner layer portion. Hereinafter, when description is made as "the carbon content in the surface layer portion" in the first sintered formed body, for example, this means "the carbon content in at least the surface layer portion of the thick part," unless otherwise noted. The same applies to the case where a content of another substance is described.

The carbon content from the position of the surface to the position at the depth of at least 30 μm from the surface of the first sintered formed body (namely, 0.7 to 15 mass ppm, and preferably 1 to 10 mass ppm) is preferably a carbon content from the position of the surface to a position at a depth of 40 μm from the surface, more preferably a carbon content from the position of the surface to a position at a depth of 60 μm from the surface, still more preferably a carbon content from the position of the surface to a position at a depth of 80 μm from the surface, and further preferably a carbon content from the position of the surface to a position at a depth of 100 μm from the surface.

Further, when the first sintered formed body configures a product together with another member, the position $ST_0$ of the surface of the thick part to be the starting point when the carbon content of the surface layer portion is measured, may also be at an interface where the first sintered formed body is brought into contact with the other member. The other member cited here is not limited to be configured by bonding or assembly, but may be configured by coating with wet coating of an organic material or an inorganic material by a flow coating method, a dip coating method, a spin coating method, a spray coating method, a flexographic printing method, a screen printing method, a gravure printing method, a roll coating method, a meniscus coating method, a die coating method, or the like, dry coating of the organic material or the inorganic material by a sputtering method or a vapor deposition method, and the like.

The carbon content of the surface layer portion in the thick part can be measured by an ordinary method with a carbon analyzer, for example, after removing an adherent on the surface by an ordinary method according to need, for example. Note that when the carbon content of the surface layer portion in the thick part is measured by setting an interface of the first sintered formed body with another member to the surface to be the starting point, the first sintered formed body is separated from the other member by an ordinary method, and then the carbon content is measured through the above-described method.

Note that a method of removing the adherent on the surface of the first sintered formed body is not particularly limited. For example, there can be cited polishing, wet etching using an etching solution, UV ozone treatment, plasma treatment, corona discharge treatment, dry etching, sand blast processing, washing with a surfactant, an alkaline washing agent, a solvent, or the like, debindimg, and the like. The polishing can be performed by using a polishing agent and a polishing device which are normally used for polishing a sintered body containing a glass. Further, the wet etching can be performed by using hydrofluoric acid, hydrochloric acid, nitric acid, sulfuric acid, a sodium hydroxide aqueous solution, a potassium hydroxide aqueous solution, a ferric chloride solution, aqua regia, or the like as the etching solution, and by appropriately selecting temperature conditions and the like. In the dry etching, it is possible to appropriately select and use $CF_4$, $CHF_3$, $O_2$, Ar, $N_2$, $Cl_2$, $BCl_3$, $CCl_4$, or the like as the gas.

The first sintered formed body has the place, in the thick part, in which the carbon content of the surface layer portion is in a range of 0.7 to 15 mass ppm, and preferably in a range of 1 to 10 mass ppm, and thus is a sintered formed body having not only a desired color and a good appearance but also sufficient strength, in which undesired coloring in a blackish color, incomplete sintering, a lack of strength, and formation of bubbles are suppressed. Note that the carbon content of the surface layer portion is more preferably 7 ppm or less, and particularly preferably 5 ppm or less.

In the first sintered formed body, the carbon content of the surface layer portion is preferably 0.7 ppm or more, and is preferably 1 ppm or more from a viewpoint of securing an accuracy of form. Note that it can be assumed that carbon contained in the sintered formed body is derived from an organic matter such as an organic binder used in a manufacturing process of the sintered formed body.

Further, it is preferable that the glass of the first sintered formed body has a softening point temperature of 700° C. or more, and contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43, regarding $B_2O_3$, MgO, CaO, SrO, BaO, $Li_2O$, $Na_2O$, $K_2O$, and $Al_2O_3$, because it is possible to easily suppress the above-described carbon content to 0.7 to 15 mass ppm, and preferably 1 to 10 mass ppm.

The reason thereof can be considered as follows. First, an element which is easily eluted from a glass and which easily causes ion-crosslinking of mutual functional groups such as hydroxyl groups of a resin is likely to impair a thermal decomposition property of the resin itself. Further, in a glass structure having $SiO_2$ as a skeleton, an element which easily generates non-crosslinked oxygen easily lowers chemical durability, easily facilitates ionization of the element composing the glass, and easily causes ion-crosslinking of mutual resins, so that the thermal decomposition property of the resin itself is likely to be impaired. Further, it can be estimated that a tendency of increasing reactivity with the resin is strong at a high temperature. When a graphite-like hardly-decomposable product is generated during a process of thermal decomposition of the resin, it can be estimated that the product is difficult to be thermally decomposed, and a residual carbon amount in the sintered formed body is easily increased. The correlations with the glass composition are put in order based on this idea, resulting in that it was found out that when $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43 is contained in mass percentage based on above oxides, the residual carbon amount in the sintered formed body tends to be decreased.

The value of $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ is preferably −0.17 or more, more preferably −0.15 or more, still more preferably −0.1 or more, and further preferably 0 or more. Further, the value is preferably 0.4 or less, more preferably 0.37 or less, and still more preferably 0.35 or less.

Further, in order to suppress undesired coloring in a blackish color, incomplete sintering, a lack of strength, and formation of bubbles, the softening point temperature is more preferably 730° C. or more, still more preferably 750°

C. or more, further preferably 760° C. or more, and particularly preferably 770° C. or more.

It is more preferable that, by setting at least the surface layer portion of the above-described thick part, namely, the surface of the thick part to a starting point, a content of a polyvalent element from the starting point to a position at a depth of at least 30 μm from the starting point in the first sintered formed body is 1 mass ppm or more. Similarly to the above-described carbon content, it is only required that the first sintered formed body has a portion, in at least a part thereof, in which the content of the polyvalent element is 1 mass ppm or more in the surface layer portion of the above-described thick part, and the contents of the polyvalent element in the range of all of the surface layer potions of all of the thick parts do not always have to fall within the above-described range.

The content of the polyvalent element from the position of the surface to the position at the depth of at least 30 μm from the surface of the first sintered formed body (namely, 1 mass ppm or more) is preferably a content of the polyvalent element from the position of the surface to a position at a depth of 40 μm from the surface, more preferably a content of the polyvalent element from the position of the surface to a position at a depth of 60 μm from the surface, still more preferably a content of the polyvalent element from the position of the surface to a position at a depth of 80 μm from the surface, and further preferably a content of the polyvalent element from the position of the surface to a position at a depth of 100 μm from the surface.

Further, although a place where the carbon content in the surface layer portion is in the range of 0.7 to 15 mass ppm, and preferably in the range of 1 to 10 mass ppm, and a place where the content of the polyvalent element is 1 mass ppm or more in the surface layer portion may match or may not match, it is preferable that the places match because it is possible to easily obtain a sintered formed body having not only a desired color and a good appearance but also sufficient strength, in which undesired coloring in a blackish color, incomplete sintering, a lack of strength, and formation of bubbles are suppressed. It is preferable that the first sintered formed body has the place where the content of the polyvalent element is 1 mass ppm or more in the surface layer portion of the thick part, since it is possible to easily provide the place where the above-described carbon content is in the range of 0.7 to 15 mass ppm, and preferably in the range of 1 to 10 mass ppm, to the surface layer portion of the thick part (namely, it is possible to easily suppress the carbon content in the thick part to 0.7 to 15 mass ppm, and preferably 1 to 10 mass ppm). The content of the polyvalent element in the surface layer portion is more preferably 10 ppm or more, still more preferably 50 ppm or more, and further preferably 100 ppm or more. An upper limit of the content of the polyvalent element in the surface layer portion is not particularly limited. However, from viewpoints of suppression of visible light absorption and suppression of unintended crystallization, the content of the polyvalent element in the surface layer portion is preferably 10% or less by mass percentage. However, when an absorption wavelength of the polyvalent element to be added and the crystallization are not problems in particular, the content may also exceed 10%.

The polyvalent element is preferably a transition element and an element capable of having a plurality of oxidation numbers when being turned into an oxide. As the polyvalent element, concretely, Sc, Ti, V, Cr, Mn, Fe, Co, Ni, Cu, Zn, Ga, Ge, As, Se, Y, Zr, Nb, Mo, Ru, Rh, Pd, Ag, Cd, In, Sn, Sb, Te, La, Ce, Pr, Nd, Pm, Sm, Eu, Gd, Tb, Dy, Ho, Er, Tm, Yb, Lu, Hf, Ta, W, Re, Os, Ir, Pt, Au, Tl, Pb, and Bi are preferable. As the polyvalent element, one kind of them may be used solely, or a combination of two kinds or more of them may also be used. When the first sintered formed body contains two kinds or more of the polyvalent element in the surface layer portion, it is only required that a total content of the elements is 1 mass ppm or more. Note that it can be said that the polyvalent element is also an element which forms an oxide capable of having thermal activity caused by thermal excitation. Regarding a mechanism of facilitating carbon combustibility at a time of sintering, it can be considered that an electron of a polyvalent element oxide generated in a process of sintering is excited in a conductor by heat and generates a hole, and at the same time, the excited electron causes strong oxidizing action and decomposing action. It is important that an oxide semiconductor having thermal activity is generated in the process of sintering.

The measurement of the content of the polyvalent element in the surface layer portion of the thick part of the first sintered formed body is performed by removing an adherent on the surface, in a similar manner to the measurement of the carbon content described above, for example. The content of the polyvalent element in the surface layer portion can be measured through an ordinary method by using, for example, an ICP atomic emission spectroscopic analyzer or an ICP mass spectroscope. Further, it is preferable to use a laser ablation ICP mass spectroscope, since it is possible to selectively analyze only a region with which laser light is irradiated.

It is more preferable that the first sintered formed body contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43, and further contains the above-described polyvalent element.

[Second Sintered Formed Body]

A second sintered formed body is a sintered formed body made of a sintered body containing a glass whose transition point temperature is 550° C. or less, in which the second sintered formed body has a portion where a carbon content from a position of a surface of the sintered formed body to a position at a depth of at least 30 μm from the surface of the sintered formed body is 0.7 to 15 mass ppm, and preferably 1 to 10 mass ppm. Note that in the present invention, it is only required that the second sintered formed body has a portion, in at least a part thereof, in which the carbon content from the position of the surface to the position at the depth of at least 30 μm from the surface is 0.7 to 15 mass ppm, and preferably 1 to 10 mass ppm, and the carbon content from every position of the surface to the position at the depth of at least 30 μm from the surface does not always have to fall within the above-described range.

In the second sintered formed body, the transition point of the glass contained in the sintered body is 550° C. or less, and the second sintered formed body does not always have a thick part with a thickness of 60 μm or more. A thickness and a depth from the surface in the second sintered formed body are similar to those of the above-described first sintered formed body. The second sintered formed body has a part (place) with a thickness of at least 30 μm or more, from a viewpoint of specifying the carbon content from the position of the surface thereof to the position at the depth of at least 30 μm from the surface to the range.

In the second sintered formed body, when a predetermined place positioned at the surface of the part with the thickness of at least 30 μm or more is set to $S_0$, and a position at a depth of 30 μm from $S_0$ set as a starting point is set to $S_{30}$, it is only required that the carbon content falls within the above-described range in a range from $S_0$ to at least $S_{30}$. According to need, the range from $S_0$ to $S_{30}$ is also referred to as a surface layer portion, and a portion deeper than $S_{30}$ is also referred to as an inner layer portion. The second sintered formed body is only required to have the carbon content within the above-described range in at least the surface layer portion. According to need, the range where the carbon content falls within the above-described range may extend to the inner layer portion. Hereinafter, when description is made as "the carbon content in the surface layer portion" in the second sintered formed body, for example, this means "the carbon content in at least the surface layer portion of the place with the thickness of at least 30 μm or more," unless otherwise noted. The same applies to the case where a content of another substance is described.

The carbon content from the position of the surface to the position at the depth of at least 30 μm from the surface of the second sintered formed body (namely, 0.7 to 15 mass ppm, and preferably 1 to 10 mass ppm) is preferably a carbon content from the position of the surface to a position at a depth of 40 μm from the surface, more preferably a carbon content from the position of the surface to a position at a depth of 60 μm from the surface, still more preferably a carbon content from the position of the surface to a position at a depth of 80 μm from the surface, and further preferably a carbon content from the position of the surface to a position at a depth of 100 μm from the surface.

Further, when the second sintered formed body configures a product together with another member, the position $S_0$ of the surface of the part with the thickness of 30 μm or more to be the starting point when the carbon content of the surface layer portion is measured, may also be at an interface where the second sintered formed body is brought into contact with the other member. The other member cited here is similar to that for the first sintered formed body.

The carbon content of the surface layer portion of the place with the thickness of at least 30 μm or more of the second sintered formed body can be measured by a method similar to that for the carbon content of the surface layer portion of the thick part of the first sintered formed body described above.

In the second sintered formed body, the glass transition point of the glass contained in the sintered body is 550° C. or less. As the glass having a glass transition point of 550° C. or less, there can be cited, for example, a tin-phosphoric acid-based glass, an alkali phosphoric acid glass, an alkali borosilicate-based glass, an alkali borosilicate zinc-based glass, a bismuth-based glass, a vanadium-based glass, and a lead-based glass, which are known as so-called low-melting point glasses, for example, and a glass having a glass transition point of 550° C. or less among low-melting point glasses of not only an oxide glass but also a halide glass and a chalcogenide glass. When an environment is taken into consideration, a glass except for the lead-based glass is preferable.

For example, the following glass can be exemplified. A glass containing, in mass percentage (%) based on following oxides,
$SiO_2$: 0 to 60,
$B_2O_3$: 0 to 60,
$Al_2O_3$: 0 to 10,
$Bi_2O_3$: 0 to 90,
$P_2O_5$: 0 to 70,
$SiO_2+B_2O_3+Al_2O_3+Bi_2O_3+P_2O_5$: 20 to 100,
SnO+ZnO: 0 to 70,
MgO+CaO+SrO+BaO: 0 to 60, and
$Li_2O+Na_2O+K_2O$: 0 to 30.

As the second sintered formed body, concretely, there can be cited a sintered body of an inorganic material containing 10 to 100 volume % of a glass whose glass transition point is 550° C. or less as a composition excluding a locally existing trace component such as carbon described above or a polyvalent element to be described later, for example, similarly to the first sintered formed body. As inorganic materials other than the glass, there can be cited ceramics, metals, semiconductors, gasses, and the like.

A sintering temperature of the glass is normally set to a temperature between the glass transition point temperature to the softening point+50° C. The second sintered formed body contains the glass whose glass transition point is 550° C. or less, and thus is a sintered formed body which has been sintered at a relatively low temperature, which results in reducing a manufacturing cost and providing excellent economic efficiency. Further, it is particularly effective when the second sintered formed body is combined with a resin material with low heat resistance, a low-melting point metal, a semiconductor, or the like, to be sintered. Note that a forming method of the second sintered formed body is not particularly limited. Note that in the present invention, the softening point temperature is measured by differential thermal analysis (DTA) (the same applies to the description hereinafter).

Conventionally, when a glass whose glass transition point is 550° C. is used to manufacture a sintered formed body by using an organic binder or the like for forming, for example, since a sintering temperature is low, it has been often the case that decomposition and removal of the organic binder cannot be sufficiently performed by the completion of the sintering, and carbon is likely to remain in the obtained sintered formed body, which causes undesired coloring, incomplete sintering, formation of bubbles, and a lack of strength. However, the second sintered formed body has a trace content of carbon due to the above-described organic binder or the like. Concretely, the second sintered formed body has the place in which the carbon content in the surface layer portion is 0.7 to 15 mass ppm, and preferably 1 to 10 mass ppm, in the part with the thickness of 30 μm or more, as described above. The second sintered formed body has the place in which the carbon content of the surface layer portion is in a range of 0.7 to 15 mass ppm, and preferably in a range of 1 to 10 mass ppm, and thus is a sintered formed body having not only a desired color and a good appearance but also sufficient strength, in which undesired coloring in a blackish color, incomplete sintering, a lack of strength, and formation of bubbles are suppressed, and also having excellent economic efficiency, as described above. Note that the carbon content of the surface layer portion is more preferably 7 ppm or less, and particularly preferably 5 ppm or less.

In the second sintered formed body, the carbon content of the surface layer portion is preferably 0.7 ppm or more, and is preferably 1 ppm or more from a viewpoint of securing an accuracy of form.

Further, it is preferable that the glass of the second sintered formed body has a softening point temperature of 700° C. or more, and contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43, regarding $B_2O_3$, MgO, CaO, SrO, BaO, $Li_2O$, $Na_2O$, $K_2O$, and $Al_2O_3$, because it is possible to easily suppress the above-described carbon content to 0.7 to 15 mass ppm, and preferably 1 to 10 mass ppm, similarly to the first sintered formed body.

The reason thereof is similar to the contents described with respect to the first sintered formed body. The value of $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ is preferably −0.17 or more, more preferably −0.15 or more, still more preferably −0.1 or more, and further preferably 0 or more. Further, the value is preferably 0.4 or less, more preferably 0.37 or less, and still more preferably 0.35 or less.

Further, in order to suppress undesired coloring in a blackish color, incomplete sintering, a lack of strength, and formation of bubbles, the softening point temperature is more preferably 730° C. or more, still more preferably 750° C. or more, further preferably 760° C. or more, and particularly preferably 770° C. or more.

It is more preferable that, by setting at least the surface layer portion of the place with the thickness of 30 μm or more described above, namely, the surface of the place with the thickness of 30 μm or more to a starting point, a content of a polyvalent element from the starting point to a position at a depth of at least 30 μm from the starting point in the second sintered formed body is 1 mass ppm or more. Similarly to the above-described carbon content, it is only required that the second sintered formed body has a place, in at least a part thereof, in which the content of the polyvalent element is 1 mass ppm or more in the surface layer portion of the part with the thickness of 30 μm or more described above, and the contents of the polyvalent element in the range of the entire surface layer portion do not always have to fall within the above-described range.

The content of the polyvalent element from the position of the surface to the position at the depth of at least 30 μm from the surface of the second sintered formed body (namely, 1 mass ppm or more) is preferably a content of the polyvalent element from the position of the surface to a position at a depth of 40 μm from the surface, more preferably a content of the polyvalent element from the position of the surface to a position at a depth of 60 μm from the surface, still more preferably a content of the polyvalent element from the position of the surface to a position at a depth of 80 μm from the surface, and further preferably a content of the polyvalent element from the position of the surface to a position at a depth of 100 μm from the surface.

Further, although a place where the carbon content in the surface layer portion is in the range of 0.7 to 15 mass ppm, and preferably in the range of 1 to 10 mass ppm, and a place where the content of the polyvalent element is 1 mass ppm or more in the surface layer portion may match or may not match, it is preferable that the places match because it is possible to easily obtain a sintered formed body having not only a desired color and a good appearance but also sufficient strength, in which undesired coloring in a blackish color, incomplete sintering, a lack of strength, and formation of bubbles are suppressed. It is preferable that the second sintered formed body has the place where the content of the polyvalent element is 1 mass ppm or more in the surface layer portion, since it is possible to easily provide the place where the above-described carbon content is in the range of 0.7 to 15 mass ppm, and preferably in the range of 1 to 10 mass ppm, to the surface layer portion (namely, it is possible to easily suppress the carbon content in the thick part to 0.7 to 15 mass ppm, and preferably 1 to 10 mass ppm).

The content of the polyvalent element in the surface layer portion is more preferably 10 ppm or more, still more preferably 50 ppm or more, and further preferably 100 ppm or more. An upper limit of the content of the polyvalent element in the surface layer portion is not particularly limited. However, from viewpoints of suppression of visible light absorption and suppression of unintended crystallization, the content of the polyvalent element in the surface layer portion is preferably 10% or less by mass percentage. However, when an absorption wavelength of the polyvalent element to be added and the crystallization are not problems in particular, the content may also exceed 10%.

As the polyvalent element, there can be cited a polyvalent element similar to that described regarding the first sintered formed body. Further, when two kinds or more of the polyvalent element are contained, it is only required that a total content thereof is 1 mass ppm or more. The content of the polyvalent element in the surface layer portion of the second sintered formed body can be measured in a similar manner to the case of the first sintered formed body.

It is more preferable that the second sintered formed body contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of −0.2 to 0.43, and further contains the above-described polyvalent element.

[Third Sintered Formed Body]

A third sintered formed body is the first sintered formed body or the second sintered formed body obtained by forming in a predetermined shape by using glass particles and an organic binder and then sintering. The glass particles correspond to the glass in the first sintered formed body or the second sintered formed body. As a method of obtaining the third sintered formed body by performing the forming in a predetermined shape by using the glass particles and the organic binder and then performing the sintering, conventionally publicly-known methods can be applied without being limited in particular. Note that regarding the forming, there can be cited injection forming, extrusion forming, coating forming, press forming, forming performed by a three-dimensional shaping device, and the like. In a case where the third sintered formed body is a sintered formed body obtained through forming performed by a three-dimensional shaping device, the effect of the present invention is exhibited more significantly from a point that it is possible to eliminate the organic binder in the sintered formed body having any shape.

As the glass composing the glass particles used for forming the third sintered formed body, one similar to the glass contained in the first sintered formed body or the second sintered formed body can be cited.

The organic binder used for forming the third sintered formed body is appropriately selected according to a forming method of the third sintered formed body. As the organic binder, there can be cited, for example, an organic binder for forming used for imparting a predetermined shape to the glass particles, an organic binder for glass particle used together with the glass particles, and the like. As a usage of the organic binder for forming, for example, there can be cited a usage in which the organic binder for forming is used for performing forming with a three-dimensional shaping device, and is supplied in a predetermined shape to a layer of glass particles prepared in a stratified state, to thereby impart a predetermined shape to the layer, or a usage in which a slurry in which the organic binder for forming having a photopolymerizable functional group, a photopolymerization initiator, a solvent, and the glass particles are uniformly dispersed, is irradiated with a laser beam or a light source of a projector or the like, to thereby impart a predetermined shape to the slurry. As a usage of the organic binder for glass particle, for example, there can be cited a usage in which a covering layer of the organic binder for glass particle is formed on surfaces of the glass particles to make a sintered formed body material, or a usage in which the organic binder for glass particle is arranged so as to fill a space among a plurality of glass particles to make a sintered formed body material formed in a particulate state as a whole.

As the organic binder, concretely, there can be cited an acryl-based resin such as polyacrylic acid, polyacrylic acid ester, polymethacrylic acid and polymethacrylic acid ester, a polymeric cellulose derivative such as ethyl cellulose, methyl cellulose, ethyl methyl cellulose, carboxymethyl cellulose, hydroxyethyl cellulose, hydroxypropyl cellulose, nitrocellulose, cellulose acetate, nitrocellulose acetate, cellulose acetate phthalate, butyl cellulose acetate, cellulose acetate propionate and cellulose sulfate, a polyvinyl acetal-based resin typified by polyvinyl acetate, polyvinyl alcohol, and polyvinyl butyral, polyvinyl methyl ether, polyvinyl butyl ether, polyvinyl pyrrolidone, polyvinyl caprolactam, polylactic acid, a polyalkylene carbonate resin such as polypropylene carbonate and polyethylene carbonate, polystyrene, polyethylene, polypropylene, a copolymer of polybutylene and maleic acid, polyethylene glycol, polypropylene glycol, polyurethane, polyester, a polyamide phenol resin, an epoxy resin, a melamine resin, an urea resin, an alkyd resin, a furan resin, polyimide, polyacrylonitrile, polybutadiene, polyacetal, polycarbonate, polyphenyleneether, polyphenylene sulfide, polysulfone, polyether ether ketone, or the like, and a copolymer of these resins.

Note that when the third sintered formed body requires shape retention during forming, in particular, such as forming performed by a three-dimensional shaping device, for example, the organic binder is suitably a resin having a polymerizable functional group, namely, a polymerizable resin. In order to further increase the shape retention, it is also possible to add a crosslinking agent at the time of the forming. The crosslinking agent can be appropriately selected as long as it can crosslink the polymerizable resin. Concretely, there can be cited a metallic salt, a metal complex, an organometallic compound, a chelate, and the like. As the metallic salt, there can be cited magnesium hydroxide, aluminum hydroxide, zirconium sulfate hydrate, and the like, as the organometallic compound, there can be cited an alkoxide or an alkyl acid salt of metal such as aluminum, silicon, titanium and zirconium, and an alkyl acid salt, and as the chelate, there can be cited an acetylacetone chelate, an octylene glycol chelate, a triethanolamine chelate, a lactic acid chelate, an ammonium lactate chelate, and the like of metal such as aluminum, silicon, titanium and zirconium.

As the polymerizable resin to be combined with the crosslinking agent, one having a functional group such as a hydroxyl group, a carboxylic acid group, an amino group, or an acetoacetyl group at a side chain is preferable. It is more preferable to use a depolymerizable resin, among the polymerizable resins. By using the depolymerizable resin, the occurrence of undesired coloring in a blackish color, incomplete sintering, a lack of strength, and formation of bubbles is suppressed in a sintered formed body containing a glass, which is sintered under an inert atmosphere or under a reduced pressure. The depolymerizable resin indicates a resin which easily causes a reaction in which a polymer is depolymerized into monomers under a high temperature, and as the resin, there can be cited poly-a-methyl styrene, polymethyl methacrylate, polypropylene carbonate, and the like. Further, the resin may also be a copolymer containing their monomers. Further, as one of methods of polymerization, it is also possible to add an addition polymerizable monomer.

As the addition polymerizable monomer, one having an isocyanate group or an epoxy group is suitable. Further, it is also possible to use a method which starts from a monomer or an oligomer, and performs polymerization at the time of forming. Further, by using a resin containing oxygen in a structure of a main chain or the like, other than the depolymerizable resin, the occurrence of undesired coloring in a blackish color, incomplete sintering, a lack of strength, and formation of bubbles is suppressed in a sintered formed body obtained by sintering. As these resins, there can be exemplified a resin having a cellulose skeleton such as ethyl cellulose or methyl cellulose, and a resin having an ether bond such as polyethylene glycol. Further, there can be cited a resin having a ring structure in a skeleton, and having a structure containing oxygen in the ring structure such as polyvinyl butyral.

The sintering after the forming is performed at a sintering temperature of the glass, normally, at a temperature between the glass transition point and about the softening point +50° C. At that time, the organic binder used for the forming is decomposed and removed. The problems caused if carbon remains in the obtained sintered formed body are as described above. The third sintered formed body has a trace content of carbon due to the above-described organic binder and the like. The carbon content in the above-described surface layer portion is similar to that in the first sintered formed body or the second sintered body. Further, the content of the polyvalent element in the surface layer portion is similar to that in the first sintered formed body or the second sintered body.

The above is the explanation regarding the first to third sintered formed bodies of the present invention. Each of the first to third sintered formed bodies of the present invention can be manufactured through the following manufacturing method of the present invention in which a sintered formed body material containing glass particles and an organic binder are used to form a pre-sintering formed body in a predetermined shape which preferably contains a polyvalent element, and the obtained pre-sintering formed body is sintered under predetermined conditions.

[Manufacturing Method]

A method of forming the pre-sintering formed body in the manufacturing method of the sintered formed body of the present invention will be described first. The pre-sintering formed body in the present invention is obtained by performing forming in a predetermined shape by using the sintered formed body material containing the glass particles, and the organic binder. The organic binder includes an organic binder for forming used for forming the pre-sintering formed body and/or an organic binder for glass particle used together with the glass particles. The pre-sintering formed body in the present invention preferably contains the polyvalent element, and, for example, it is obtained by introducing the polyvalent element into a formed body for sintering formed by an ordinary method (which corresponds to a precursor of the pre-sintering formed body of the present invention, and a formed body before sintering which does not contain the polyvalent element), through preferably the following method (1) or method (2). Further, it is also possible that the method (1) and the method (2) are combined to be used, according to need. In that case, the precursor of the pre-sintering formed body may also be previously made to contain the polyvalent element by the method of (1).

The method (1) is a method in which a sintered formed body material having glass particles and a polyvalent element around the glass particles of the present invention to be described later, is used as the sintered formed body material containing the glass particles. The method (2) is a method in which a composition containing the polyvalent element is added to the organic binder for forming or a precursor of the pre-sintering formed body so that a content of the polyvalent element becomes 1 mass ppm or more relative to the mass of the glass particles.

The method (2) concretely has respective processes of the following (A) forming process and (B2) addition process.

(A) The forming process of forming the precursor of the pre-sintering formed body in a predetermined shape by using the glass particles and the organic binder.

(B2) The addition process of adding the composition containing the polyvalent element to the organic binder for forming or the precursor of the pre-sintering formed body so that a content of the polyvalent element becomes 1 mass ppm or more relative to the mass of the glass particles.

In the manufacturing method of the present invention, when the composition containing the polyvalent element is added to the precursor of the pre-sintering formed body, the addition process of (B2) is performed after the process of (A). When the composition containing the polyvalent element is added to the organic binder for forming, the process (B2) is performed before the process (A) or during the process (A).

Here, the addition process in the method (2) in which the composition containing the polyvalent element is added to the organic binder for forming or the precursor of the pre-sintering formed body so that the content of the polyvalent element becomes 1 mass ppm or more relative to the mass of the glass particles, is set to the addition process (B2), as described above. Also when the sintered formed body material having the glass particles and the polyvalent element around the glass particles used in the method (1) is produced, a method (B1) of adding the composition containing the polyvalent element to the glass particles, the organic binder for glass particle, and the like, is used in a similar manner. These methods are collectively set as the addition process (B) to be described hereinafter.

Specifically, the addition process (B) is concretely a process of adding the composition containing the polyvalent element to at least one selected from the glass particle, the organic binder for forming, a particulate aggregate of glass particles obtained by mixing the glass particles and the organic binder for glass particle, a particulate glass particle covered with organic binder in which a covering layer of the organic binder for glass particle is provided on a surface of the glass particle, the organic binder for glass particle, and the precursor of the pre-sintering formed body.

Hereinafter, respective processes will be described.

(A) Forming Process

The forming process is a process of forming the pre-sintering formed body in the predetermined shape by using the glass particles and the organic binder.

A composition of the glass particle to be used is not particularly limited as long as it is possible to stably perform sintering through sintering from a state of particles. Concretely, it is possible to cite a composition similar to that described regarding the first sintered formed body and a composition similar to that described regarding the second sintered formed body, respectively. A shape of the glass particle may employ a plate shape, a bar shape, a spherical shape, and the like, and thus a form of the glass particle is not particularly limited. When considering uniform sintering of the glass particles, a shape close to a spherical shape is preferable. The glass particles can be manufactured in a manner that a powder mixture of raw materials is prepared in accordance with a glass composition of a glass to be obtained, and is melted and cooled through an ordinary method. The glass particles can be shaped in various forms at the time of the cooling or an operation after the cooling.

More concretely, the glass particles can be obtained by the following manner for example. The powder mixture of the raw materials prepared as above is put into a container such as a platinum crucible, the raw materials is heated to be melted for a predetermined period of time in a heating furnace such as an electric furnace to be turned into a glass, the melt of the glass is formed in a sheet shape by using a water-cooled roller, and ground by a grinder to have an appropriate size, to thereby obtain a particulate glass. The grinding can be performed through dry grinding and/or wet grinding. Further, after the grinding, it is also possible to perform classification according to need in order to adjust a particle diameter. Alternatively, it is also possible to directly obtain a spherical particle through an atomizing method or the like from the melt of the glass. It is preferable to use the atomizing method, because it is possible to obtain a glass particle whose shape is close to a true sphere, and to improve flowability of the glass particles.

A particle diameter of the glass particle is not particularly limited, and, for example, it is appropriately selected by a method of forming the pre-sintering formed body. If indicated by a 50% particle diameter $D_{50}$ (hereinafter, also simply referred to as "$D_{50}$") based on number or based on volume, the particle diameter of the glass particle is suitably about 5 nm to 200 μm. Note that in the present specification, $D_{50}$ indicates a value measured by performing image analysis of a microscope image, a value measured by using a laser diffraction scattering method, or an approximate particle diameter calculated from a surface area measured by a BET method.

When the addition process (B) is performed on the glass particles, the glass particles are preferably spherical glass particles having average sphericity of 0.8 or more. Further, the glass particles are preferably spherical glass particles having flowability in which an angle of repose measured by an infusion method funnel is 50 degrees or less. The average sphericity of the glass particles can be measured by photographing a large number of glass particles with an optical microscope, and performing measurement based on an image.

As a kind of a material of the organic binder, a kind similar to that described with respect to the third sintered formed body described above can be cited. Note that as described above, in order to impart the shape retention to the pre-sintering formed body, the organic binder is suitably a polymerizable resin. As examples of the polymerizable resin, examples similar to those described above can be cited.

Further, as the organic binder, for example, there can be cited the organic binder for forming, the organic binder for glass particle, and the like, in accordance with the usage at the time of forming the pre-sintering formed body, similarly to the organic binder described with respect to the third sintered formed body. When forming the pre-sintering formed body, either the organic binder for forming or the organic binder for glass particle may be solely used, or both of them may also be used as the organic binder.

As a form of combining and using the glass particles and the organic binder for glass particle, for example, there can be cited a particulate glass particle covered with organic binder in which a covering layer of the organic binder for glass particle is formed on a surface of the glass particle, an aggregate of glass particles formed in a particulate state by mixing the glass particles and the organic binder for glass particle, and the like. As the aggregate of glass particles, there can be cited one in which the organic binder for glass particle is arranged so as to fill a space among a plurality of glass particles to have a particle shape as a whole.

Here, in the aggregate of glass particles, $D_{50}$ of the aggregate of glass particles is preferably 1 to 200 μm, from a viewpoint that it is effective to increase the flowability for filling mutual materials in uniform and close-packed manner.

Note that in the forming process, it is also possible to use a material other than the glass particles and the organic binder, according to need. When the sintered formed body is formed of the glass and an inorganic material other than the glass, for example, the aggregate of glass particles may also be configured of the glass particles, the inorganic material other than the glass, and the organic binder for glass particle. Further, a material obtained by forming a covering layer of the organic binder for glass particle on the inorganic material other than the glass may also be used for forming the pre-sintering formed body together with the glass particle covered with organic binder.

As the inorganic material other than the glass, an inorganic material similar to that described with respect to the first sintered formed body can be cited. Further, a content ratio of the glass particles and the inorganic material can also be set in a similar manner to the content ratio described with respect to the first sintered formed body.

As a ratio of the glass particles and the organic binder used for the forming, there can be cited a ratio in which the organic binder has 0.05 to 500 parts by mass relative to 100 parts by mass of the total amount of the inorganic material including the glass particles. When the organic binder includes only the organic binder for glass particle, a ratio of the organic binder relative to 100 parts by mass of the total amount of the inorganic material including the glass particles is preferably 0.1 to 20 parts by mass. Further, when the organic binder includes only the organic binder for forming, a ratio of the organic binder relative to 100 parts by mass of the total amount of the inorganic material including the glass particles is preferably 0.1 to 300 parts by mass. When both of the organic binder for forming and the organic binder for glass particle are used, a total amount thereof is preferably 0.1 to 300 parts by mass relative to 100 parts by mass of the total amount of the inorganic material including the glass particles.

Further, the organic binder for forming and/or the organic binder for glass particle may also be used together with a solvent in a form of so-called vehicle (organic binder solution), for example, as will be described in examples to be described later. The solvent is not particularly limited as long as it is a solvent which dissolves the organic binder to be used. For example, a solvent of terpineol, butyl carbitol acetate, ethyl carbitol acetate, or the like is used for the polymeric cellulose derivative, a solvent of methyl ethyl ketone, terpineol, butyl carbitol acetate, ethyl carbitol acetate, propylene glycol monomethyl ether, toluene, xylene, propanol, butanol, or the like is used for the acryl-based resin and the polyvinyl acetal-based resin, a solvent of propylene carbonate, triacetin, or the like is used for the polyalkylene carbonate resin, and a solvent of water, alcohol, ether, or the like, is used for a water-soluble resin. When considering environmental protection, it is preferable to use the water-soluble resin.

However, the organic binder for forming and/or the organic binder for glass particle are/is not limited to be used in the form of examples such as the vehicle, and, for example, it is also possible to employ a form in which the binder(s) is/are used as the organic binder itself such as an organic binder powder. A ratio of the organic binder and the solvent used as the vehicle is a ratio in which the solvent has about 100 to 5000 parts by mass relative to 100 parts by mass of the organic binder.

As a method of forming the pre-sintering formed body, there can be cited injection forming, extrusion forming, coating forming, press forming, forming performed by a three-dimensional shaping device, and the like. In a case where the forming of the pre-sintering formed body is performed by a three-dimensional shaping device, the manufacturing method of the present invention is superior to the other methods from a point of degree of freedom of forming, and resolution. The forming performed by the three-dimensional shaping device is referred to as three-dimensional printing, hereinafter.

As a method of the three-dimensional printing, for example, the following methods of (1) to (7) classified as Additive Manufacturing (AM) defined by ASTM F42 Committee are known.

(1) Vat Photo-Polymerization (VP Method)

The VP method is a method in which a light-curing resin in a vat is selectively cured by a UV laser or the like to add a shape. Stereo Lithography (SLA method) or the like is a method classified as the VP method.

(2) Sheet Lamination (SL Method)

The SL method is a method in which a sheet material such as paper is cut to be stacked.

(3) Binder Jetting (BJ Method)

The BJ method is a method in which a powder material is selectively coated with a binder by ink jet to be added and stacked.

(4) Material Extrusion (ME Method)

The ME method is a method in which a material is selectively added to be deposited from an extrusion nozzle. A fused deposition modeling method (FDM method) or the like is a method classified as the ME method.

(5) Material Jetting (MJ Method)

The MJ method is a method in which a material is selectively added to be deposited by inkjet. A type in which the material itself is jetted from the ink jet is generally used, but, other than that, a type of jetting ink in which fine particles are dispersed is also included in the MJ method.

(6) Powder Bed Fusion (PBF Method)

The PBF method is a method in which a powder material is selectively sintered and fused by a laser or an electron beam to be added and deposited.

(7) Directed Energy Deposition (DED Method)

The DED method is a method in which a powder material is selectively added to be deposited while being fused by a laser.

It is possible to use these methods at the time of forming the pre-sintering formed body by using the three-dimensional printing in the present invention, but, the present invention is not limited to these methods. When considering that the forming in the predetermined shape is performed by using the glass particles and the organic binder, it is preferable to employ the (1) VP method, the (3) BJ method, the (4) ME method, and the (5) MJ method in the present invention.

(B) Addition Process

The addition process is a process of adding the composition containing the polyvalent element to at least one selected from the glass particle, the organic binder for forming, the particulate aggregate of glass particles obtained by mixing the glass particles and the organic binder for glass particle, the particulate glass particle covered with organic binder in which the covering layer of the organic binder for glass particle is provided on the surface of the glass particle, the organic binder for glass particle, and the precursor of the pre-sintering formed body.

In the manufacturing method of the present invention, this process (B) is included, so that the pre-sintering formed body contains the polyvalent element, and accordingly, the organic binder contained in the pre-sintering formed body is sufficiently decomposed and removed at the time of the sintering, resulting in that the sintered formed body to be obtained is a sintered formed body in which a residual carbon amount derived from the organic binder is very small as in the first sintered formed body, the second sintered formed body, and the third sintered formed body, for example, and having not only a desired color and a good appearance but also sufficient strength, in which undesired coloring due to carbon, incomplete sintering, formation of bubbles, and a lack of strength are eliminated.

As described above, an object to which the composition containing the polyvalent element is added in the addition process (B) may be any of the material alone used in the process (A), a combination of the materials, or the precursor of the pre-sintering formed body to be obtained. In the addition process, the composition containing the polyvalent element may be added to one kind of the above or may also be added to two kinds or more of the above. Here, to add the composition containing the polyvalent element to a particulate matter such as the glass particle, the glass particle covered with organic binder, or the aggregate of glass particles, indicates that the composition containing the polyvalent element is made to adhere to the surface of the particulate matter being the object of addition. This does not mean that the composition containing the polyvalent element is made to be contained in the inside of the particulate matter itself being the object of addition.

As the polyvalent element, it is possible to use the polyvalent element described above as the element preferable to be contained in the first sintered formed body. As the composition containing the polyvalent element, there can be cited a compound made by bonding the polyvalent element and an element other than the polyvalent element, a composition containing the compound, and the like. As the compound made by bonding the polyvalent element and the element other than the polyvalent element, there can be cited an oxide, a halide, or a hydroxide of the polyvalent element, a reaction product of the polyvalent element with acid or a base, and the like. These compounds are normally solid bodies, and even if the compounds are added as they are, the effect possessed by the polyvalent element of facilitating the decomposition of the organic binder is difficult to be sufficiently exhibited, and besides, it cannot be said that uniform dispersibility with respect to the inside of the pre-sintering formed body is sufficient.

In the process (B) in the manufacturing method of the present invention, it is preferable to perform addition processing on the object of addition, by using a salt of the polyvalent element or a solution thereof The addition processing is preferably processing in which the solution of the salt of the polyvalent element is preferably used to make the salt of the polyvalent element adhere to the surface of the object. Concretely, it is preferable to use a method in which the salt of the polyvalent element is made as a solution, uniformly coated on the surface of the object, and the solvent is removed, to thereby make the salt adhere to the surface of the object.

In this case, a concentration of the salt of the polyvalent element in the used solution is preferably 0.01 to 20 mass %. The solvent is only required to be a solvent capable of dissolving the salt of the polyvalent element, and is preferably water, alcohol, a solvent other than the above with large polarity, or the like.

A method of coating the solution of the salt of the polyvalent element is not particularly limited as long as it is a method capable of performing uniform coating on the surface of the coating object, and it is possible to use a publicly-known method such as a flow coating method, a dip coating method, a spin coating method, a spray coating method, a flexographic printing method, a screen printing method, a gravure printing method, a roll coating method, a meniscus coating method, or a die coating method. A coating amount is preferably an amount to be 1 to 100,000 ppm, when converted into an amount of the polyvalent element, relative to the mass of the glass particles.

Further, when the composition containing the polyvalent element is added to the particulate matters such as the glass particle, the glass particle covered with organic binder, and the aggregate of glass particles, a shape of each of these particulate matters is preferably a spherical shape, and an average sphericity thereof is suitably 0.8 or more.

Note that in examples to be described later, the solution of the salt of the polyvalent element is used for the addition of the composition containing the polyvalent element, but, the addition of the composition containing the polyvalent element is not limited to be performed by the addition of the solution. For example, it is also possible that, before obtaining the pre-sintering formed body, the glass powder and the salt of the polyvalent element are previously mixed, the organic binder and the salt of the polyvalent element are previously mixed, the salt of the polyvalent element is previously dissolved in the organic binder solution, or the organic binder solution and the polyvalent element solution are previously mixed, and thus the addition of the composition containing the polyvalent element is not limited to embodiments of examples.

Further, it is also possible that the organic binder for glass particle or a solution thereof and the salt of the polyvalent element or a solution thereof are mixed, and then the mixture is mixed with the glass particles to be formed in a particulate state, to thereby obtain an aggregate of glass particles having the organic binder containing the polyvalent element, and it is also possible to obtain a glass particle covered with organic binder having an organic binder layer containing the polyvalent element formed by covering a surface of the glass particle with a coating solution made by mixing the solution of the organic binder for glass particle and the salt of the polyvalent element or a solution thereof In any of the above cases, an amount of the addition of the composition containing the polyvalent element with respect to the object of addition is preferably an amount to be 1 to 100,000 ppm, when converted into an amount of the polyvalent element, relative to the mass of the glass particles.

As a preferable example of the addition of the composition containing the polyvalent element, processing in which the salt of the polyvalent element is made to adhere to the surface of the particulate matters such as the glass particle, the glass particle covered with organic binder, and the aggregate of glass particles, and the surface of the precursor of the pre-sintering formed body, is preferable among the above. Further, it is preferable to employ an example in which the salt of the polyvalent element is uniformly provided in the organic binder in the glass particle covered with organic binder, and the aggregate of glass particles.

These can be dealt as a sintered formed body material of the present invention to be described below, except for the precursor of the pre-sintering formed body.

[Sintered Formed Body Material]

The sintered formed body material of the present invention is a sintered formed body material having glass particles and an organic binder, and the glass particles and the organic binder are similar to the glass particles and the organic binder described with respect to the third sintered formed body.

The sintered formed body material of the present invention is preferably a material for a sintered formed body in which the polyvalent element is provided around the glass particles. The description that the polyvalent element is provided around the glass particles means that there are a plurality of glass particles and the polyvalent element is provided among the plurality of glass particles. The glass particles can be set to be similar to the glass particles used for the forming process (A) in the manufacturing method of the sintered formed body of the present invention described above, including preferable examples thereof. Further, the polyvalent element can also be set to be similar to the polyvalent element used for the addition process (B) in the manufacturing method of the sintered formed body of the present invention described above.

Further, the sintered formed body material preferably contains the polyvalent element by 1 mass ppm or more relative to the mass of the glass particles. When 1 mass ppm or more of the polyvalent element with respect to the glass particles is contained, the sintered formed body to be obtained by using the sintered formed body material can easily set the carbon content to a very small amount, as in the first sintered formed body, the second sintered formed body, and the third sintered formed body, for example. Accordingly, there is provided a sintered formed body having not only a desired color and a good appearance but also sufficient strength, in which undesired coloring due to carbon, incomplete sintering, formation of bubbles, and a lack of strength are eliminated.

As a preferable example of the sintered formed body material, there can be cited an example in which the polyvalent element is provided on the surface of the glass particle. Further, as another example, it is preferable to employ an example in which the polyvalent element is provided to any of a surface of a particulate aggregate of glass particles obtained by mixing the glass particles and the organic binder for glass particle, an inside of the particulate aggregate of glass particles obtained by mixing the glass particles and the organic binder for glass particle, a surface of the glass particle covered with organic binder in which a covering layer of the organic binder for glass particle is provided on a surface of the glass particle, and an inside of the covering layer of the glass particle covered with organic binder in which the covering layer of the organic binder for glass particle is provided on the surface of the glass particle. Note that when the polyvalent element is provided to the inside of the aggregate of glass particles or the inside of the covering layer of the glass particle covered with organic binder, it is preferable to employ an example in which the polyvalent element is provided to either the surface of the glass particle or the inside of the organic binder for glass particle.

Note that FIG. 1 schematically illustrates a cross section of a particulate aggregate of glass particles 10, being a particulate aggregate of glass particles obtained by mixing the glass particles and the organic binder for glass particle, made in a manner that a polyvalent element 3 is uniformly contained while a space among a plurality of glass particles 1 is filled with an organic binder for glass particle 2.

By using the sintered formed body material of the present invention, it is possible to obtain a sintered formed body having a very small carbon content and having not only a desired color and a good appearance but also sufficient strength, as in the first sintered formed body, the second sintered formed body, and the third sintered formed body, for example.

The sintered formed body of the present invention is obtained by, for example, executing a sintering process (C) of sintering the pre-sintering formed body of the present invention obtained after the forming process (A) and preferably the addition process (B).

(C) Sintering Process

The sintering process (C) is a process of sintering the pre-sintering formed body obtained after the forming process (A) and preferably the addition process (B). The sintering is performed, by using a sintering furnace, for example, at a sintering temperature of the glass contained in the pre-sintering formed body, normally, at a temperature from the glass transition point to about the softening point+50° C. Note that it is preferable to perform the sintering under a predetermined reduced pressure, as in examples to be described later, because bubbles in a molten glass are reduced at the time of the sintering. However, in the manufacturing method of the present invention, the sintering is not limited to be performed under the reduced pressure, and the sintering may be performed under an atmospheric pressure or under an inert atmosphere. As a condition of the reduced pressure, $10^{-5}$ to $10^5$ Pa in terms of absolute pressure is preferable, $10^{-3}$ to $10^3$ Pa is more preferable, and $10^{-1}$ to $10^2$ Pa is still more preferable.

Note that according to need, it is also possible to perform drying for removing the arbitrarily used solvent or debindimg for removing the organic binder, after the forming process (A) and preferably the addition process (B) and before the sintering process (C). A temperature and a period of time of the drying and the debindimg can be appropriately selected in accordance with the kind and the amount of the used solvent and organic binder.

[Article Having Sintered Formed Body]

The sintered formed body of the present invention is used, by itself, as furniture, tableware, a bottle or an accessory made of glass, a laboratory glass product, a multiple tube burner, and the like, for example. As described above, the sintered formed body of the present invention can be applied to a sintered formed body required to have an original color of a sintered glass with suppression of coloring in a gray color, strength and small amount of bubbles.

Further, as an article having the sintered formed body obtained by being combined with another member, there can be cited a sealed product in which a periphery of a plurality of glass plates is sealed by the sintered formed body of the present invention, and the like, but, the article is not limited to these. As the sealed product, there can be cited flat panel display devices (FPD) such as an organic EL display (OELD) and a plasma display panel (PDP), a liquid crystal display device (LCD), solar cells such as an organic thin-film solar cell and a dye sensitized solar cell, and the like. Further, it is possible to widely apply the technique of the present sintered formed body to articles provided with complicated channels and structures such as an oxide fuel cell (SOFC), a micro-channel, and a biosensor.

EXAMPLE

Hereinafter, description will be made in detail while referring to examples. Note that the present invention is not limited at all by these examples. Examples 1, 3, 4, 6 to 11, 16, 17, 18 to 26, and 27 to 36 are examples, and Examples 2, 5, 12 to 15, 37, and 38 are Comparative Examples.

Examples 1 and 2

Materials and conditions illustrated in Table 1 were used to produce sintered formed bodies of Example 1 and Example 2, respectively, in the following manner. Further, evaluation was performed in the following manner on the obtained sintered formed bodies. Results thereof are collectively illustrated in Table 1. In Examples 1 and 2, a glass A is K-808 (manufactured by Asahi Glass Co., Ltd.), and an organic binder is PVA2000 (manufactured by KANTO CHEMICAL CO., INC.). Note that Table 9 shows used glass powders (the same applies to the following description).

(1) Pre-sintering formed body (precursor containing no polyvalent element) In a mortar, 5 g of glass particles (aluminoborosilicate-based glass) and a solution of organic binder (solution made by dissolving 0.1 g of organic binder in 0.25 g of solvent (which is also referred to as organic binder solution, hereinafter)) were put, and mixed for 10 minutes by using a pestle. After that, the mixture was put into a 20 mm square metal mold made of SUS, and pressed under a pressure of 20 kg/cm$^2$, to be formed in a rectangular parallelepiped shape of 20 mm×20 mm×7 mm. Thereafter, this formed product was dried at 80° C. for 16 hours, to thereby obtain a precursor of a pre-sintering formed body.

(2) Addition of Polyvalent Element

Onto an entire surface of each of six faces of the precursor of the pre-sintering formed body obtained as above, 1 mL of a solution of the polyvalent element (solution made by dissolving the salt of the polyvalent element in a solvent, in which a concentration of the polyvalent element was adjusted to be 0.5% by mass percentage (which is also referred to as polyvalent element solution, hereinafter)) was uniformly coated to be permeated. The polyvalent element was added so that an amount thereof became about 1,000 mass ppm relative to the mass of the glass particles. Basically, the polyvalent element whose amount is almost the same as the amount of the added polyvalent element remains in the sintered formed body.

(3) Sintered Formed Body

The pre-sintering formed product after being subjected to the addition of the polyvalent element (Example 1) and the pre-sintering formed product on which the addition of the polyvalent element was not performed (Example 2) were put into an electric furnace, a temperature was raised from room temperature to a predetermined debindimg temperature at 5° C./minute under an air atmosphere, and the products were retained at the debindimg temperature for a predetermined debindimg time. After that, a pressure in the electric furnace was reduced to about 10 Pa, the temperature was further raised to a predetermined sintering temperature at 5° C./minute, and the products were retained under the reduced pressure and at the sintering temperature for 10 minutes to be sintered. Thereafter, the temperature was lowered to the room temperature at 5° C./minute, to thereby obtain sintered formed bodies.

(4) Evaluation

A surface of each of the sintered formed bodies was wiped with ethanol and dried, and thereafter, the sintered formed body of about 1 to 5 mm from its surface, including the surface, was crushed, the crushed pieces of 0.3 g in total were weighed, and a carbon content (ppm based on mass) from a position of the surface to a position of at least 30 μm from the surface (full depth, in the present examples) was measured by using a carbon analyzer (CARBON ANALYZER EMIA-321V, manufactured by HORIBA, Ltd.). Further, coloring of the sintered formed bodies was visually observed.

Example 1 had a color of milk white, and it was possible to obtain a color close to the original color of the sintered glass at the time of sintering the glass powder used in Example 1. Results are illustrated in Table 1 together with the used materials, manufacturing conditions, and the like. In Table 1, the depth from the surface in the column of the contained carbon indicates that the carbon content from the surface up to the depth was measured (the same applies to Tables hereinbelow). Note that in both of Example 1 and Example 2, the similar coloring was observed over the full depth. Therefore, it can be considered that the carbon content (mass ppm) from the surface to the position at the depth of at least 30 μm from the surface is substantially the same as the carbon content in the full depth (the same applies to the following respective examples).

Examples 3 to 5

Materials and conditions illustrated in Table 2 were used to produce sintered formed bodies of Examples 3 to 5, respectively, in the following manner. Further, evaluation was performed in the following manner on the obtained sintered formed bodies. Results thereof are collectively illustrated in Table 2.

(1) Pre-Sintering Formed Body (Precursor Containing No Polyvalent Element)

Five-gram of glass particles and a solution of organic binder (solution made by dissolving 0.1 g of organic binder in 0.25 g of solvent (which is also referred to as organic binder solution, hereinafter)) were put into a container made of PP, and stirred for 5 minutes by using a planetary centrifugal mixer (ARE-310, manufactured by THINKY CORPORATION). After that, the mixture was put into a beaker made of PFA with φ30 mm, and formed in a columnar shape of about φ30 mm×3 mm. Thereafter, this formed product was dried at 80° C. for 16 hours, to thereby obtain a precursor of a pre-sintering formed body.

(2) Pre-Sintering Formed Body (Precursor Containing Polyvalent Element)

Five-gram of glass particles, a solution of organic binder (solution made by dissolving 0.1 g of organic binder in 0.25 g of solvent (which is also referred to as organic binder solution, hereinafter)), and a solution of the polyvalent element (solution made by dissolving the salt of the polyvalent element in a solvent, in which a concentration of the polyvalent element was adjusted to be 0.5% by mass percentage (which is also referred to as polyvalent element solution, hereinafter)) were put into a container made of PP, and stirred for 5 minutes by using a planetary centrifugal mixer (ARE-310, manufactured by THINKY CORPORATION). After that, the mixture was put into a beaker made of PFA with φ30 mm, and formed in a columnar shape of about φ30 mm×3 mm. Thereafter, this formed product was dried at 80° C. for 16 hours, to thereby obtain a precursor of a pre-sintering formed body. The solution of the polyvalent element was added so that an amount of the polyvalent element became about 1,000 mass ppm relative to the mass of the glass particles. Basically, the polyvalent element whose amount is almost the same as the amount of the added polyvalent element remains in the sintered formed body.

(3) Sintered Formed Body

The pre-sintering formed products on which the addition of the polyvalent element was performed (Examples 3 and 4) and the pre-sintering formed product on which the addition of the polyvalent element was not performed (Example 5) were put into an electric furnace, a temperature was raised from room temperature to 300° C. at 5° C./minute under an air atmosphere, the products were retained for two hours, the temperature was then raised to a predetermined debindimg temperature at 5° C./minute, and the products were retained at the debindimg temperature for a predetermined debindimg time. After that, the temperature was further raised to a predetermined sintering temperature at 5° C./minute in the air atmosphere, and the products were retained at the sintering temperature for 10 minutes to be sintered. Thereafter, the temperature was lowered to the room temperature at 5° C./minute, to thereby obtain sintered formed bodies.

(4) Evaluation

The sintered formed body of about 1 to 5 mm from its surface, including the surface, was crushed, the crushed pieces of 0.3 g in total were weighed, and a carbon content (ppm based on mass) from a position of the surface to a position of at least 30 μm from the surface (full depth, in the present examples) was measured by using a carbon analyzer (CARBON ANALYZER EMIA-321V, manufactured by HORIBA, Ltd.). Further, coloring of the sintered formed bodies was visually observed. Example 3 had a pale blue color due to a copper ion of the added polyvalent element, Example 4 had a white color, and thus in each of Examples, undesired coloring in a blackish color due to carbon was not observed.

In each of Examples 3 and 4, the carbon content was 0.7 to 15 ppm because of the addition of the polyvalent element, similarly to Example 1, and undesired coloring in a blackish color due to carbon was not observed.

Examples 6 to 17

Materials and conditions illustrated in Tables 3 and 4 were used to produce sintered formed bodies of Examples 6 to 17, respectively, by a method similar to that of Examples 3 to 5, and further, evaluation was also performed in a similar manner on the obtained sintered formed bodies. Results thereof are collectively illustrated in Tables 3 and 4.

The glass used in each of Examples 6 to 11 contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ (also referred to as Equation 1, hereinafter) of −0.2 to 0.43. In each of Examples, the carbon content became 0.7 to 15 ppm, the color thereof was white, and undesired coloring in a blackish color due to carbon was not observed. Note that in Examples 16 and 17, the value of Equation 1 exceeded 0.43, but, since the polyvalent element was added and the organic binder was an ethyl(meth)acrylate-methyl(meth)acrylate-hydroxyethyl(meth)acrylate copolymer, and undesired coloring in a blackish color due to carbon was not observed.

On the other hand, in Examples 12 and 13, the value of $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ exceeded 0.43, and the carbon content was large, resulting in that coloring in a blackish color due to carbon was observed. Further, in each of Examples 14 and 15, the polyvalent element was added, the organic binder was polyvinyl alcohol, and the carbon content was large, so that coloring in a blackish color due to carbon was observed.

Examples 18 to 26

Materials and conditions illustrated in Tables 5 and 6 were used to produce sintered formed bodies of Examples 18 to 26, respectively, by a method similar to that of Examples 3 to 5, and further, evaluation was also performed in a similar manner on the obtained sintered formed bodies. Results thereof are collectively illustrated in Tables 5 and 6.

Each of Examples 18 to 21 used methyl cellulose being a polymeric cellulose derivative-based resin, Example 22 used polyvinyl butyral, Example 23 used polyisobutyl methacrylate being a depolymerizable resin, Example 24 used an ethyl(meth)acrylate-methyl(meth)acrylate-hydroxyethyl(meth)acrylate copolymer being a depolymerizable resin, and each of Examples 25 and 26 used polypropylene carbonate, and accordingly, in each of Examples, the carbon content became 15 ppm or less. Although the polyvalent element was not added in each of Examples 18 and 22 to 25, undesired coloring in a blackish color due to carbon was not observed. In each of Examples 19 to 21 and 26 in which the polyvalent element was added, undesired coloring in a blackish color due to carbon was not observed.

Examples 27 to 38

Materials and conditions illustrated in Tables 7 and 8 were used to produce sintered formed bodies of Examples 27 to 38, respectively, by a method similar to that of Examples 3 to 5, and further, evaluation was also performed in a similar manner on the obtained sintered formed bodies. Results thereof are collectively illustrated in Tables 7 and 8.

The glass used in each of Examples 27 to 38 is a glass which contains, in mass percentage based on following oxides, $0.0144 \times B_2O_3 + 0.0248 \times MgO + 0.0178 \times CaO + 0.0097 \times SrO + 0.0065 \times BaO + 0.0335 \times Li_2O + 0.0161 \times Na_2O + 0.0106 \times K_2O - 0.0098 \times Al_2O_3$ of greater than 0.43, and has a transition point of 550° C. or less.

In Examples 37 and 38, polyethylene glycol being a resin containing oxygen in its structure, and polypropylene carbonate being a depolymerizable resin were used, respectively, as the organic binder, but, the polyvalent element was not added, and thus the carbon content exceeded 15 ppm. In each of Examples 27, 29, 30, and 33 to 36, the polyvalent element was further added, and thus the carbon content was 0.7 to 15 ppm, and undesired coloring in a blackish color due to carbon was not observed.

In Examples 28, 31, and 32, ethyl cellulose, polyisobutyl methacrylate, and an ethyl(meth)acrylate-methyl(meth)acrylate-hydroxyethyl(meth)acrylate copolymer were used, respectively, with respect to the glass D, the polyvalent element was not added, and the carbon content was 0.7 to 15 ppm. When compared to Example 28 (with the carbon content of 13.1 ppm), the carbon contents in Examples 29 and 30 in which the polyvalent element was added were reduced to 8.8 ppm and 11.4 ppm, respectively.

TABLE 1

|  |  | Example 1 | Example 2 |
|---|---|---|---|
| Glass powder | Kind | Glass A | Glass A |
|  | Particle diameter $D_{50}$ | 14 μm | 14 μm |
|  | Transition point (DTA) | 630° C. | 630° C. |
|  | Softening point (DTA) | 761° C. | 761° C. |
| Organic binder solution or the like | Organic binder | Polyvinyl alcohol | Polyvinyl alcohol |
|  | Solvent | Ion-exchange water | Ion-exchange water |
| Polyvalent element solution or the like | Salt of polyvalent element | Cerium chloride (III) | — |
|  | Solvent | Ion-exchange water | — |
|  | Addition amount relative to mass of glass particles | 1000 ppm | — |
|  | Addition of polyvalent element | Added | Not Added |
| Debinding | Temperature | 600° C. | 600° C. |
|  | Time | 24 hours | 24 hours |
| Sintering | Temperature | 780° C. | 780° C. |
|  | Time | 10 minutes | 10 minutes |
| Contained carbon | Depth from surface | Full depth | Full depth |
|  | Carbon content | 4.6 ppm | 30.6 ppm |
|  | Coloring | Milk white color | Gray color |

TABLE 2

|  |  | Example 3 | Example 4 | Example 5 |
|---|---|---|---|---|
| Glass powder | Kind | Glass A | Glass A | Glass A |
|  | Particle diameter $D_{50}$ | 3.1 μm | 3.1 μm | 3.1 μm |
|  | Transition point (DTA) | 630° C. | 630° C. | 630° C. |
|  | Softening point (DTA) | 761° C. | 761° C. | 761° C. |
| Organic binder solution or the like | Organic binder | Polyvinyl alcohol | Polyvinyl alcohol | Polyvinyl alcohol |
|  | Solvent | Ion-exchange water | Ion-exchange water | Ion-exchange water |
| Polyvalent element solution or the like | Salt of polyvalent element | Copper chloride (II) | Bismuth chloride (III) | — |
|  | Solvent | Ion-exchange water | Nitric acid aqueous solution | — |
|  | Addition amount relative to mass of glass particles | 1000 ppm | 1000 ppm | — |
|  | Addition of polyvalent element | Added | Added | Not Added |
| Debinding | Temperature | 600° C. | 600° C. | 600° C. |
|  | Time | 4 hours | 4 hours | 4 hours |
| Sintering | Temperature | 780° C. | 780° C. | 780° C. |
|  | Time | 10 minutes | 10 minutes | 10 minutes |
| Contained carbon | Depth from surface | Full depth | Full depth | Full depth |
|  | Carbon content | 1.2 ppm | 2.1 ppm | 65.2 ppm |
|  | Coloring | Pale blue color | White color | Black color |

TABLE 3

|  |  | Example 6 | Example 7 | Example 8 | Example 9 | Example 10 | Example 11 |
|---|---|---|---|---|---|---|---|
| Glass powder | Kind | Glass B | Glass C | Glass I | Glass J | Glass M | Glass K |
|  | Particle diameter $D_{50}$ | 12.5 μm | 1.2 μm | 2.8 μm | 2.7 μm | 0.04 μm | 2.8 μm |
|  | Transition point (DTA) | 550° C. | 495° C. | 597° C. | 702° C. | 907° C. | 715° C. |
|  | Softening point (DTA) | 785° C. | 800° C. | 771° C. | 907° C. | 1273° C. | 868° C. |
| Organic binder solution or the like | Organic binder | Polyvinyl alcohol | Polyvinyl alcohol | Polyvinyl alcohol | Polyvinyl alcohol | Polyvinyl alcohol | Polyvinyl alcohol |
|  | Solvent | Ion-exchange water | Ion-exchange water | Ion-exchange water | Ion-exchange water | Ion-exchange water | Ion-exchange water |

TABLE 3-continued

|  |  | Example 6 | Example 7 | Example 8 | Example 9 | Example 10 | Example 11 |
|---|---|---|---|---|---|---|---|
| Polyvalent element solution or the like | Salt of polyvalent element | — | — | — | — | — | — |
|  | Solvent | — | — | — | — | — | — |
|  | Addition amount relative to mass of glass particles | — | — | — | — | — | — |
|  | Addition of polyvalent element | Not Added | Not Added | Not Added | Not Added | Not Added | Not Added |
| Debindimg | Temperature | 520° C. | 450° C. | 580° C. | 650° C. | 700° C. | 680° C. |
|  | Time | 4 hours | 4 hours | 4 hours | 4 hours | 4 hours | 4 hours |
| Sintering | Temperature | 820° C. | 820° C. | 790° C. | 930° C. | 1300° C. | 890° C. |
|  | Time | 10 minutes | 10 minutes | 10 minutes | 10 minutes | 10 minutes | 10 minutes |
| Contained carbon | Depth from surface | Full depth | Full depth | Full depth | Full depth | Full depth | Full depth |
|  | Carbon content | 2.9 ppm | 4.9 ppm | 8.3 ppm | 5.3 ppm | 2.2 ppm | 12.9 ppm |
|  | Coloring | White color | White color | White color | White color | White color | White color |

TABLE 4

|  |  | Example 12 | Example 13 | Example 14 | Example 15 | Example 16 | Example 17 |
|---|---|---|---|---|---|---|---|
| Glass powder | Kind | Glass H | Glass L | Glass H | Glass L | Glass H | Glass L |
|  | Particle diameter $D_{50}$ | 3.0 μm | 1.9 μm | 3.0 μm | 1.9 μm | 3.0 μm | 1.9 μm |
|  | Transition point (DTA) | 554° C. | 648° C. | 554° C. | 648° C. | 554° C. | 648° C. |
|  | Softening point (DTA) | 691° C. | 833° C. | 691° C. | 833° C. | 691° C. | 833° C. |
| Organic binder solution or the like | Organic binder | Polyvinyl alcohol | Polyvinyl alcohol | Polyvinyl alcohol | Polyvinyl alcohol | Ethyl(meth)acrylate-methyl(meth)acrylate-hydroxyethyl(meth)acrylate copolymer | Ethyl(meth)acrylate-methyl(meth)acrylate-hydroxyethyl(meth)acrylate copolymer |
|  | Solvent | Ion-exchange water | Ion-exchange water | Ion-exchange water | Ion-exchange water | Toluene/ ethanol | Toluene/ ethanol |
| Polyvalent element solution or the like | Salt of polyvalent element | — | — | Cerium chloride (III) | Cerium chloride (III) | Cerium chloride (III) | Cerium chloride (III) |
|  | Solvent | — | — | Ion-exchange water | Ion-exchange water | Ethanol | Ethanol |
|  | Addition amount relative to mass of glass particles | — | — | 1000 ppm | 1000 ppm | 1000 ppm | 1000 ppm |
|  | Addition of polyvalent element | Not Added | Not Added | Added | Added | Added | Added |
| Debindimg | Temperature | 530° C. | 620° C. | 530° C. | 620° C. | 530° C. | 620° C. |
|  | Time | 4 hours | 4 hours | 4 hours | 4 hours | 4 hours | 4 hours |
| Sintering | Temperature | 720° C. | 850° C. | 720° C. | 850° C. | 720° C. | 850° C. |
|  | Time | 10 minutes | 10 minutes | 10 minutes | 10 minutes | 10 minutes | 10 minutes |
| Contained carbon | Depth from surface | Full depth | Full depth | Full depth | Full depth | Full depth | Full depth |
|  | Carbon content | 1075 ppm | 30.6 ppm | 831 ppm | 19.1 ppm | (1 to 15 ppm) | (1 to 15 ppm) |
|  | Coloring | Black color | Gray color | Black color | Gray color | (White color) | (White color) |

TABLE 5

|  |  | Example 18 | Example 19 | Example 20 | Example 21 | Example 22 |
|---|---|---|---|---|---|---|
| Glass powder | Kind | Glass A | Glass A | Glass A | Glass A | Glass A |
|  | Particle diameter $D_{50}$ | 3.1 μm | 3.1 μm | 3.1 μm | 3.1 μm | 3.1 μm |
|  | Transition point (DTA) | 630° C. | 630° C. | 630° C. | 630° C. | 630° C. |
|  | Softening point (DTA) | 761° C. | 761° C. | 761° C. | 761° C. | 761° C. |
| Organic binder solution or the like | Organic binder | Methyl cellulose | Methyl cellulose | Methyl cellulose | Methyl cellulose | Polyvinyl butyral |
|  | Solvent | Ion-exchange water | Ion-exchange water | Ion-exchange water | Ion-exchange water | Toluene/ xylene/ isopropyl alcohol |

TABLE 5-continued

|  |  | Example 18 | Example 19 | Example 20 | Example 21 | Example 22 |
|---|---|---|---|---|---|---|
| Polyvalent element solution or the like | Salt of polyvalent element | — | Cerium chloride (III) | Copper chloride (II) | Bismuth chloride (III) | — |
|  | Solvent | — | Ion-exchange water | Ion-exchange water | Nitric acid aqueous solution | — |
|  | Addition amount relative to mass of glass particles | — | 1000 ppm | 1000 ppm | 1000 ppm | — |
|  | Addition of polyvalent element | Not Added | Added | Added | Added | Not Added |
| Debindimg | Temperature | 600° C. | 600° C. | 600° C. | 600° C. | 600° C. |
|  | Time | 4 hours | 4 hours | 4 hours | 4 hours | 4 hours |
| Sintering | Temperature | 780° C. | 780° C. | 780° C. | 780° C. | 780° C. |
|  | Time | 10 minutes | 10 minutes | 10 minutes | 10 minutes | 10 minutes |
| Contained carbon | Depth from surface | Full depth | Full depth | Full depth | Full depth | Full depth |
|  | Carbon content | 8.5 ppm | 5.1 ppm | 6.0 ppm | 3.4 ppm | 7.0 ppm |
|  | Coloring | Pale gray color | White color | Pale blue color | White color | Pale gray color |

TABLE 6

|  |  | Example 23 | Example 24 | Example 25 | Example 26 |
|---|---|---|---|---|---|
| Glass powder | Kind | Glass A | Glass A | Glass A | Glass A |
|  | Particle diameter $D_{50}$ | 3.1 μm | 3.1 μm | 3.1 μm | 3.1 μm |
|  | Transition point (DTA) | 630° C. | 630° C. | 630° C. | 630° C. |
|  | Softening point (DTA) | 761° C. | 761° C. | 761° C. | 761° C. |
| Organic binder solution or the like | Organic binder | Polyisobutyl methacrylate | Ethyl(meth)acrylate-methyl(meth)acrylate-hydroxyethyl(meth)acrylate copolymer | Polypropylene carbonate | Polypropylene carbonate |
|  | Solvent | Toluene/ethanol | Toluene/ethanol | Propylene glycol monomethyl ether acetate | Propylene glycol monomethyl ether acetate |
| Polyvalent element solution or the like | Salt of polyvalent element | — | — | — | Copper chloride (II) |
|  | Solvent | — | — | — | Ethanol |
|  | Addition amount relative to mass of glass particles | — | — | — | 1000 ppm |
|  | Addition of polyvalent element | Not Added | Not Added | Not Added | Added |
| Debindimg | Temperature | 600° C. | 600° C. | 600° C. | 600° C. |
|  | Time | 4 hours | 4 hours | 4 hours | 4 hours |
| Sintering | Temperature | 780° C. | 780° C. | 780° C. | 780° C. |
|  | Time | 10 minutes | 10 minutes | 10 minutes | 10 minutes |
| Contained carbon | Depth from surface | Full depth | Full depth | Full depth | Full depth |
|  | Carbon content | 2.8 ppm | 6.7 ppm | 6.4 ppm | 2.3 ppm |
|  | Coloring | Pale gray color | Pale gray color | Pale gray color | Pale blue color |

TABLE 7

|  |  | Example 27 | Example 28 | Example 29 | Example 30 | Example 31 | Example 32 |
|---|---|---|---|---|---|---|---|
| Glass powder | Kind | Glass D | Glass D | Glass D | Glass D | Glass D | Glass D |
|  | Particle diameter $D_{50}$ | 3.1 μm | 3.1 μm | 3.1 μm | 3.1 μm | 3.1 μm | 3.1 μm |
|  | Transition point (DTA) | 490° C. | 490° C. | 490° C. | 490° C. | 490° C. | 490° C. |
|  | Softening point (DTA) | 580° C. | 580° C. | 580° C. | 580° C. | 580° C. | 580° C. |
| Organic binder solution or the like | Organic binder | Polyethylene glycol | Ethyl cellulose | Ethyl cellulose | Ethyl cellulose | Polyisobutyl methacrylate | Ethyl(meth)acrylate-methyl(meth)acrylate-hydroxyethyl(meth)acrylate copolymer |
|  | Solvent | Ion-exchange water | Ethanol | Ethanol | Ethanol | Toluene/ethanol | Toluene/ethanol |

TABLE 7-continued

|  |  | Example 27 | Example 28 | Example 29 | Example 30 | Example 31 | Example 32 |
|---|---|---|---|---|---|---|---|
| Polyvalent element solution or the like | Salt of polyvalent element | Copper chloride (II) | — | Copper chloride (II) | Bismuth chloride (III) | — | — |
|  | Solvent | Ion-exchange water | — | Ethanol | Ethanol | — | — |
|  | Addition amount relative to mass of glass particles | 1000 ppm | — | 1000 ppm | 1000 ppm | — | — |
|  | Addition of polyvalent element | Added | Not Added | Added | Added | Not Added | Not Added |
| Debindimg | Temperature | 450° C. | 450° C. | 450° C. | 450° C. | 450° C. | 450° C. |
|  | Time | 4 hours | 4 hours | 4 hours | 4 hours | 4 hours | 4 hours |
| Sintering | Temperature | 620° C. | 620° C. | 620° C. | 620° C. | 620° C. | 620° C. |
|  | Time | 10 minutes | 10 minutes | 10 minutes | 10 minutes | 10 minutes | 10 minutes |
| Contained carbon | Depth from surface | Full depth | Full depth | Full depth | Full depth | Full depth | Full depth |
|  | Carbon content | 8.4 ppm | 13.1 ppm | 8.8 ppm | 11.4 ppm | 6.1 ppm | 12.2 ppm |
|  | Coloring | Pale blue color | White color | Pale blue color | White color | White color | White color |

TABLE 8

|  |  | Example 33 | Example 34 | Example 35 | Example 36 | Example 37 | Example 38 |
|---|---|---|---|---|---|---|---|
| Glass powder | Kind | Glass D | Glass F | Glass F | Glass F | Glass D | Glass F |
|  | Particle diameter $D_{50}$ | 3.1 μm | 4.3 μm | 4.3 μm | 4.3 μm | 3.1 μm | 4.3 μm |
|  | Transition point (DTA) | 490° C. | 535° C. | 535° C. | 535° C. | 490° C. | 535° C. |
|  | Softening point (DTA) | 580° C. | 780° C. | 780° C. | 780° C. | 580° C. | 780° C. |
| Organic binder solution or the like | Organic binder | Polypropylene carbonate | Ethyl cellulose | Polyisobutyl methacrylate | Polypropylene carbonate | Polyethylene glycol | Polypropylene carbonate |
|  | Solvent | Propylene glycol monomethyl ether acetate | Ethanol | Toluene/ ethanol | Propylene glycol monomethyl ether acetate | Ion-exchange water | Propylene glycol monomethyl ether acetate |
| Polyvalent element solution or the like | Salt of polyvalent element | Copper chloride (II) | Copper chloride (II) | Copper chloride (II) | Copper chloride (II) | — | — |
|  | Solvent | Ethanol | Ethanol | Ethanol | Ethanol | — | — |
|  | Addition amount relative to mass of glass particles | 1000 ppm | 1000 ppm | 1000 ppm | 1000 ppm | — | — |
|  | Addition of polyvalent element | Added | Added | Added | Added | Not Added | Not Added |
| Debindimg | Temperature | 450° C. | 500° C. | 500° C. | 500° C. | 450° C. | 500° C. |
|  | Time | 4 hours | 4 hours | 4 hours | 4 hours | 4 hours | 4 hours |
| Sintering | Temperature | 620° C. | 830° C. | 830° C. | 830° C. | 620° C. | 830° C. |
|  | Time | 10 minutes | 10 minutes | 10 minutes | 10 minutes | 10 minutes | 10 minutes |
| Contained carbon | Depth from surface | Full depth | Full depth | Full depth | Full depth | Full depth | Full depth |
|  | Carbon content | 13.6 ppm | 9.2 ppm | 11.0 ppm | 9.0 ppm | 34.9 ppm | 17.9 ppm |
|  | Coloring | Pale blue color | Pale blue color | Milk white color | Pale blue color | Gray color | Gray color |

TABLE 9

| [mass %] | A | B | C | D | F | H | I | J | K | L | M |
|---|---|---|---|---|---|---|---|---|---|---|---|
| $SiO_2$ | 36.0 | 80.0 | 78.0 | 10.0 | 35.0 | 73.0 | 61.0 | 60.0 | 50.0 | 57.0 | 100.0 |
| $B_2O_3$ | 15.0 | 13.0 | 19.0 | 23.0 | 35.0 | 0.0 | 0.0 | 8.0 | 0.0 | 17.0 | 0.0 |
| $Al_2O_3$ | 4.0 | 3.0 | 0.0 | 2.0 | 10.0 | 1.5 | 13.0 | 17.0 | 8.0 | 9.0 | 0.0 |
| ZnO | 0.0 | 0.0 | 0.0 | 50.0 | 0.0 | 0.0 | 0.0 | 0.0 | 0.0 | 0.0 | 0.0 |
| MgO | 0.0 | 0.0 | 0.0 | 0.0 | 0.0 | 4.0 | 6.5 | 3.0 | 0.0 | 0.0 | 0.0 |
| CaO | 0.0 | 0.0 | 0.0 | 3.0 | 0.0 | 8.0 | 0.0 | 4.0 | 3.0 | 13.0 | 0.0 |
| SrO | 0.0 | 0.0 | 0.0 | 4.0 | 0.0 | 0.0 | 0.0 | 8.0 | 12.0 | 0.0 | 0.0 |
| BaO | 45.0 | 0.0 | 0.0 | 0.0 | 20.0 | 0.0 | 0.5 | 0.0 | 27.0 | 0.0 | 0.0 |
| $Li_2O$ | 0.0 | 0.0 | 0.0 | 0.0 | 0.0 | 0.0 | 0.0 | 0.0 | 0.0 | 0.0 | 0.0 |
| $Na_2O$ | 0.0 | 4.0 | 0.0 | 3.0 | 0.0 | 13.0 | 12.0 | 0.0 | 0.0 | 2.0 | 0.0 |
| $K_2O$ | 0.0 | 0.0 | 3.0 | 4.0 | 0.0 | 0.5 | 6.0 | 0.0 | 0.0 | 2.0 | 0.0 |

TABLE 9-continued

| [mass %] | A | B | C | D | F | H | I | J | K | L | M |
|---|---|---|---|---|---|---|---|---|---|---|---|
| ZrO$_2$ | 0.0 | 0.0 | 0.0 | 0.0 | 0.0 | 0.0 | 1.0 | 0.0 | 0.0 | 0.0 | 0.0 |
| SnO$_2$ | 0.0 | 0.0 | 0.0 | 1.0 | 0.0 | 0.0 | 0.0 | 0.0 | 0.0 | 0.0 | 0.0 |
| 0.0144 × B$_2$O$_3$ + 0.0248 × MgO + 0.0178 × CaO + 0.0097 × SrO + 0.0065 × BaO + 0.0335 × Li$_2$O + 0.0161 × Na$_2$O + 0.0106 × K$_2$O − 0.0098 × Al$_2$O$_3$ | 0.470 | 0.223 | 0.305 | 0.494 | 0.536 | 0.442 | 0.294 | 0.172 | 0.267 | 0.441 | 0.000 |

What is claimed is:

1. A sintered formed body, consisting of a sintered body comprising a glass, and having a thick part with a thickness of 60 μm or more,
wherein a carbon content from a position of a surface of the thick part to a position at a depth of at least 30 μm from the surface of the thick part is 0.7 to 15 mass ppm, and
the glass has a softening point temperature of 700° C. or more, and comprises, in mass percentage based on the following oxides, 0.0144×B$_2$O$_3$+0.0248×MgO+0.0178×CaO+0.0097×SrO+0.0065×BaO+0.0335×Li$_2$O+0.0161×Na$_2$O+0.0106×K$_2$O−0.0098×Al$_2$O$_3$ in a range of from −0.2 to 0.43.

2. The sintered formed body of claim 1, wherein a content of a polyvalent element from the position of the surface of the thick part to the position at the depth of at least 30 μm from the surface of the thick part is 1 mass ppm or more.

3. The sintered formed body of claim 1, obtained by forming glass particles and an organic binder, to obtain a pre-sintering formed body in a predetermined shape, and then sintering the pre-sintering formed body.

4. The sintered formed body of claim 3, wherein the organic binder comprises any of a polymerizable resin, a depolymerizable resin, and a resin comprising oxygen in its structure.

5. The sintered formed body of claim 4, wherein the organic binder comprises any of a polymethacrylate-based resin or a copolymer thereof, a polypropylene carbonate-based resin, a polymeric cellulose derivative-based resin, a polyvinyl butyral-based resin, and a polyethylene glycol-based resin.

6. The sintered formed body of claim 3, wherein the forming is performed by a three-dimensional shaping device.

7. An article comprising the sintered formed body of claim 1.

8. The sintered formed body of claim 1, wherein the carbon content is 1 to 10 mass ppm.

9. A sintered body, consisting of a sintered body comprising a glass whose transition point temperature is 550° C. or less,
wherein the sintered formed body has a portion where a carbon content from a position of a surface of the sintered formed body to a position at a depth of at least 30 μm from the surface of the sintered formed body is 0.7 to 15 mass ppm, and
the glass has a softening point temperature of 700° C. or more, and comprises, in mass percentage based on the following oxides, 0.0144×B$_2$O$_3$+0.0248×MgO+0.0178×CaO+0.0097×SrO+0.0065×BaO+0.0335×Li$_2$O+0.0161×Na$_2$O+0.0106×K$_2$O−0.0098×Al$_2$O$_3$ in a range of from −0.2 to 0.43.

10. The sintered formed body of claim 9, wherein a content of a polyvalent element from the position of the surface of the sintered formed body to the position at the depth of at least 30 μm from the surface of the sintered formed body is 1 mass ppm or more.

11. The sintered formed body of claim 9, wherein the carbon content is 1 to 10 mass ppm.

12. The sintered formed body of claim 9, obtained by forming glass particles and an organic binder, to obtain a pre-sintering formed body in a predetermined shape, and then sintering the pre-sintering formed body.

13. The sintered formed body of claim 12, wherein the organic binder comprises any of a polymerizable resin, a depolymerizable resin, and a resin comprising oxygen in its structure.

14. The sintered formed body of claim 13 wherein the organic binder comprises any of a polymethacrylate-based resin or a copolymer thereof, a polypropylene carbonate-based resin, a polymeric cellulose derivative-based resin, a polyvinyl butyral-based resin, and a polyethylene glycol-based resin.

15. The sintered formed body of claim 12, wherein the forming is performed by a three-dimensional shaping device.

16. An article comprising the sintered formed body of claim 9.

17. A sintered formed body material, comprising glass particles and an organic binder,
wherein the organic binder comprises any of a polymerizable resin, a depolymerizable resin, and a resin comprising oxygen in its structure, and
the glass panicles have a softening point temperature of 700° C. or more, and comprise, in mass percentage based on the following oxides, 0.0144×B$_2$O$_3$+0.0248×MgO+0.0178×CaO+0.0097×SrO+0.0065×BaO+0.0335×Li$_2$O+0.0161×Na$_2$O+0.0106×K$_2$O−0.0098×Al$_2$O$_3$ in a range of from −0.2 to 0.43.

18. The sintered formed body material of claim 17, wherein the organic binder comprises any of a polymethacrylate-based resin or a copolymer thereof, a polypropylene carbonate-based resin, a polymeric cellulose derivative-based resin, a polyvinyl butyral-based resin, and a polyethylene glycol-based resin.

19. The sintered formed body material of claim 17, further comprising a polyvalent element provided around the glass particles.

20. The sintered formed body material of claim 19, which has the polyvalent element at any of
a surface of the glass particles,
a surface of a particulate aggregate of glass particles obtained by mixing the glass particles and an organic binder for glass particles,
an inside of the particulate aggregate,
a surface of a glass particle covered with organic binder in which a covering layer of the organic binder for glass particles is provided on a surface of the glass particle, and
an inside of the covering layer.

21. The sintered formed body material of claim 19, wherein a content of the polyvalent element is 1 mass ppm or more relative to a mass of the glass particles.

22. The sintered formed body material of claim 17, wherein the glass particles have a particle diameter $D_{50}$ in a range of from 5 nm to 200 μm.

23. A method of manufacturing a pre-sintering formed body, the method comprising forming a pre-sintering formed body in a predetermined shape from a sintered formed body material comprising glass particles and an organic binder, wherein:

the organic binder comprises an organic binder for forming used for forming the pre-sintering formed body and/or an organic binder for glass particles used together with the glass particles; and the sintered formed body material is the sintered formed body material of claim 17.

24. The method of claim 23, further comprising adding a composition comprising a polyvalent element to the organic binder for forming or a precursor of the pre-sintering formed body so that a content of the polyvalent element becomes 1 mass ppm or more relative to a mass of the glass particles.

25. The method of claim 23, wherein the organic binder comprises any of a polymerizable resin, a depolymerizable resin, and a resin comprising oxygen in its structure.

26. The method of claim 25, wherein the organic binder comprises any of a polymethacrylate-based resin or a copolymer thereof, a polypropylene carbonate-based resin, a polymeric cellulose derivative-based resin, a polyvinyl butyral-based resin, and a polyethylene glycol-based resin.

27. The method of claim 24, wherein the composition is a salt of the polyvalent element or a solution of the salt.

28. The method of claim 23, wherein the forming is performed by a three-dimensional shaping device.

29. A pre-sintering formed body, manufactured by the method of claim 23.

30. A method of manufacturing a sintered formed body, the method comprising manufacturing a pre-sintering formed body by the method of claim 23, and sintering the pre-sintering formed body at a temperature between a transition point temperature of the glass particles to a softening point +50° C. to obtain a sintered formed body.

31. The sintered formed body material of claim 17, further comprising a polyvalent element provided around the glass particles.

* * * * *